(12) United States Patent  (10) Patent No.: US 8,711,384 B2
Suzuki  (45) Date of Patent: Apr. 29, 2014

(54) IMAGE FORMING APPARATUS, CONTROL METHOD AND COMPUTER-READABLE MEDIUM FOR STOPPING A PRINT JOB DURING PRINTING BY A PRINTER

(75) Inventor: Shintarou Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 13/232,215

(22) Filed: Sep. 14, 2011

(65) Prior Publication Data

US 2012/0092686 A1  Apr. 19, 2012

(30) Foreign Application Priority Data

Oct. 19, 2010 (JP) ................................. 2010-234916

(51) Int. Cl.
*G06K 15/00* (2006.01)
*G06F 9/46* (2006.01)

(52) U.S. Cl.
USPC .......................................... 358/1.14; 718/108

(58) Field of Classification Search
None
See application file for complete search history.

(56) References Cited

U.S. PATENT DOCUMENTS 6,633,395 B1 * 10/2003 Tuchitoi et al. ............... 358/1.14
7,916,317 B2 * 3/2011 Kitamura ..................... 358/1.14

FOREIGN PATENT DOCUMENTS

JP  2003-256179 A  9/2003

* cited by examiner

*Primary Examiner* — Barbara Reinier
(74) *Attorney, Agent, or Firm* — Fitzpatrick, Cella, Harper & Scinto

(57) ABSTRACT

An image forming apparatus including a drawing unit which generates pixel data based on print data and an image processing unit which performs image processing for the pixel data, the apparatus comprises: a determination unit configured to determine, while the drawing unit and the image processing unit are performing processing, whether the image processing unit as an output destination of pixel data generated is configured to be stopped when receiving a stop instruction for the processing from a control unit; and a transmission unit configured to transmit pixel data of predetermined color values to the image processing unit for the number of pixels which have not been processed in processing of generating the pixel data when the determination unit determines that the image processing unit is not configured to be stopped, wherein the image processing unit performs image processing by using pixel data of the predetermined color values transmitted.

13 Claims, 34 Drawing Sheets

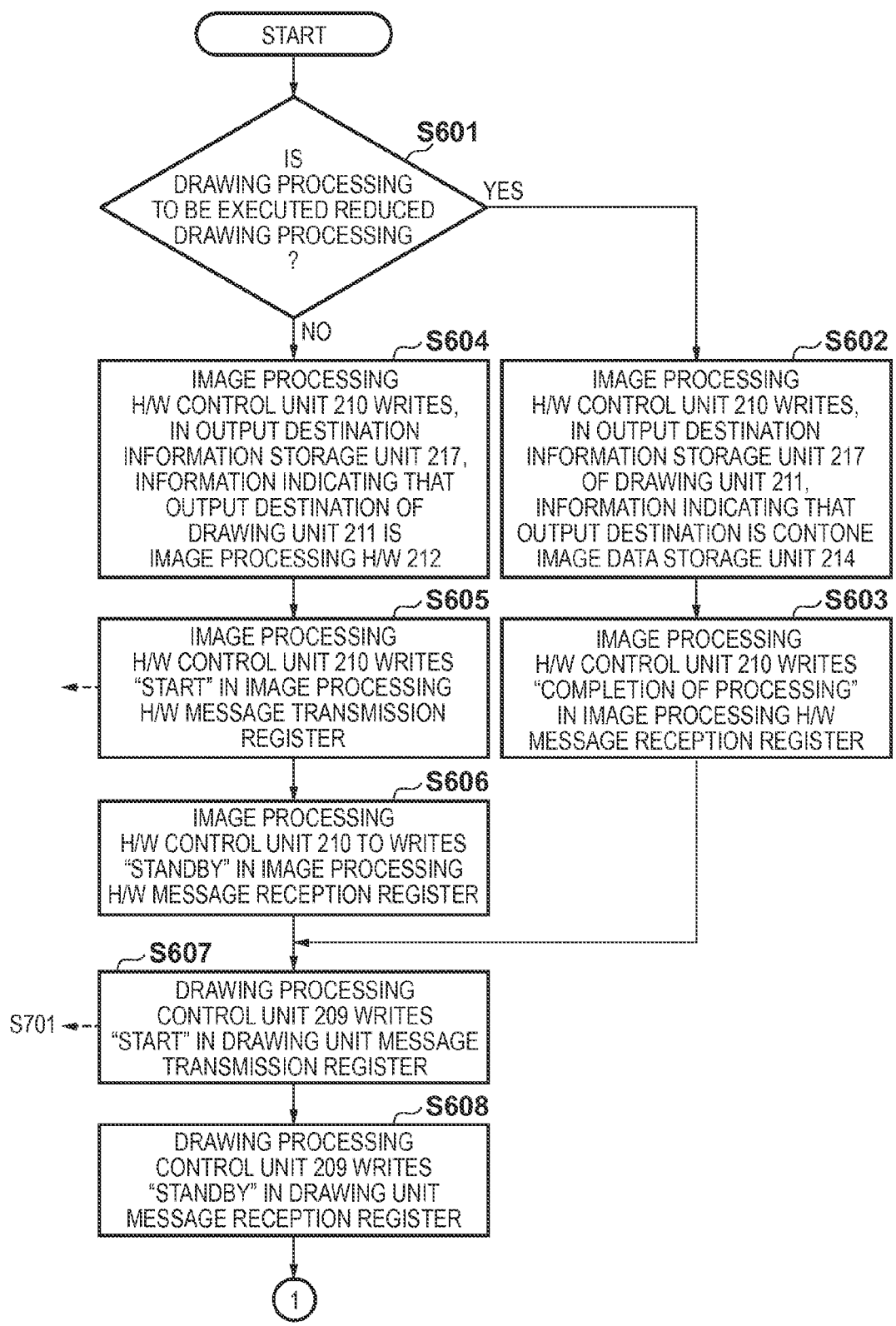

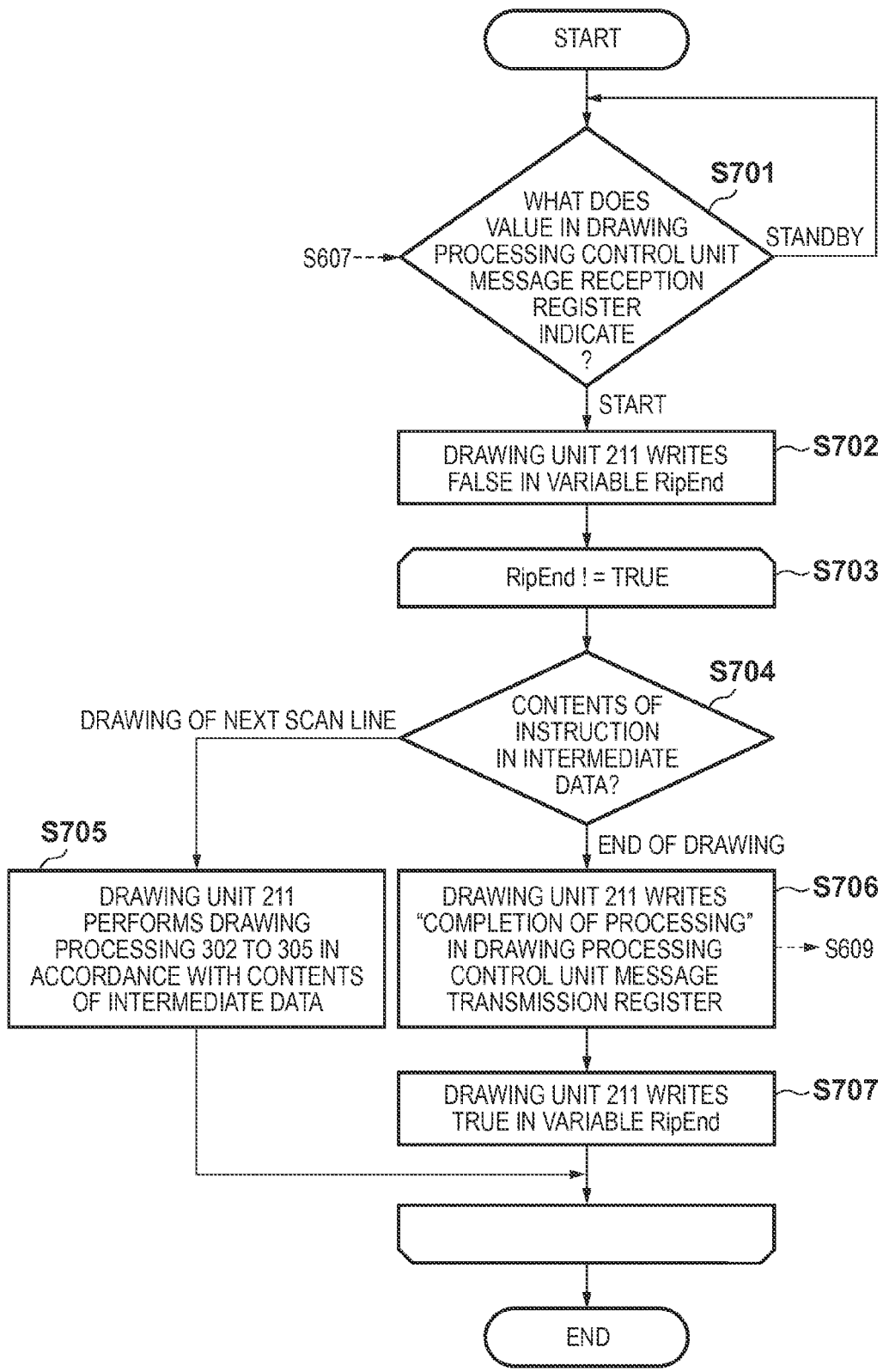

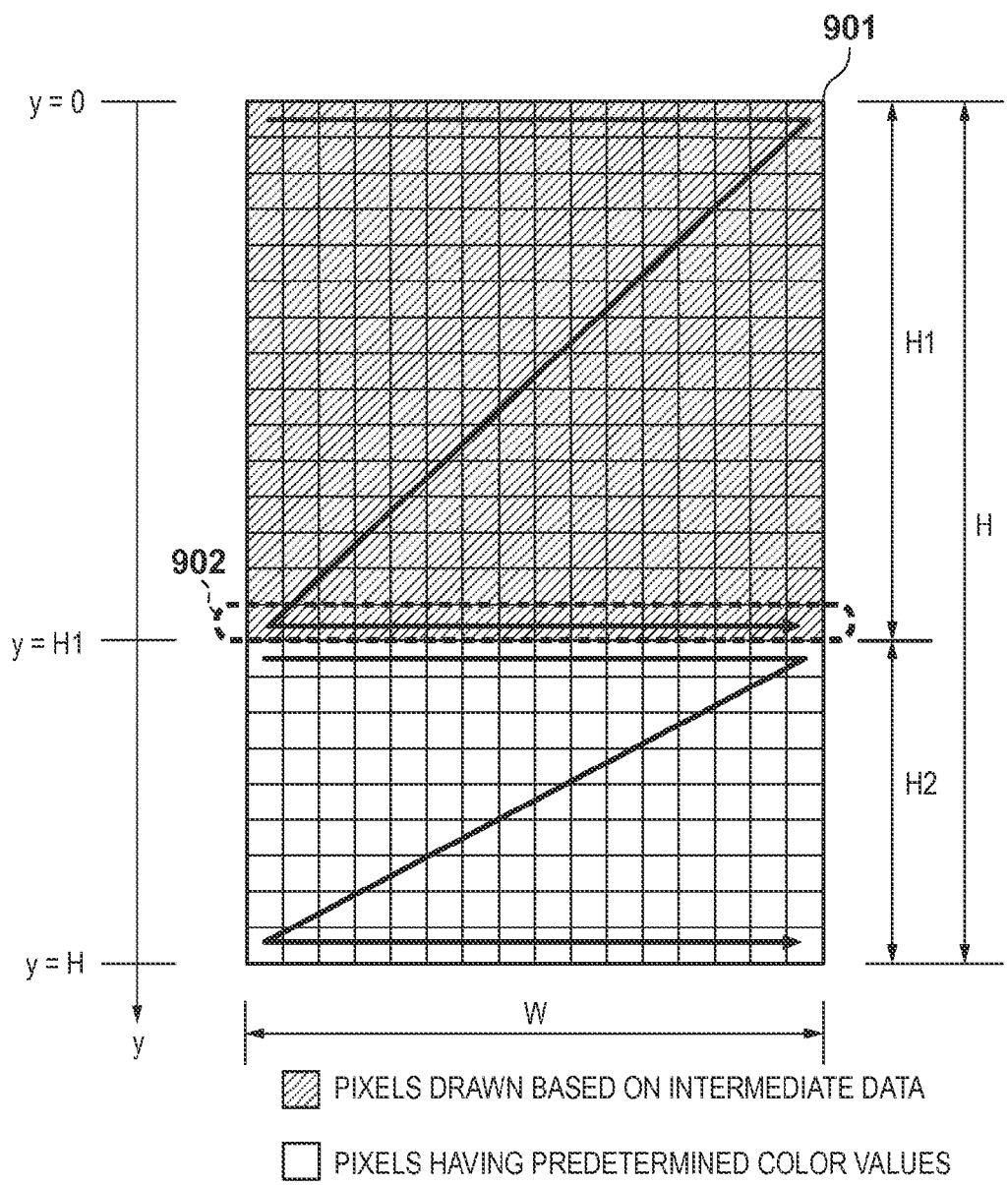

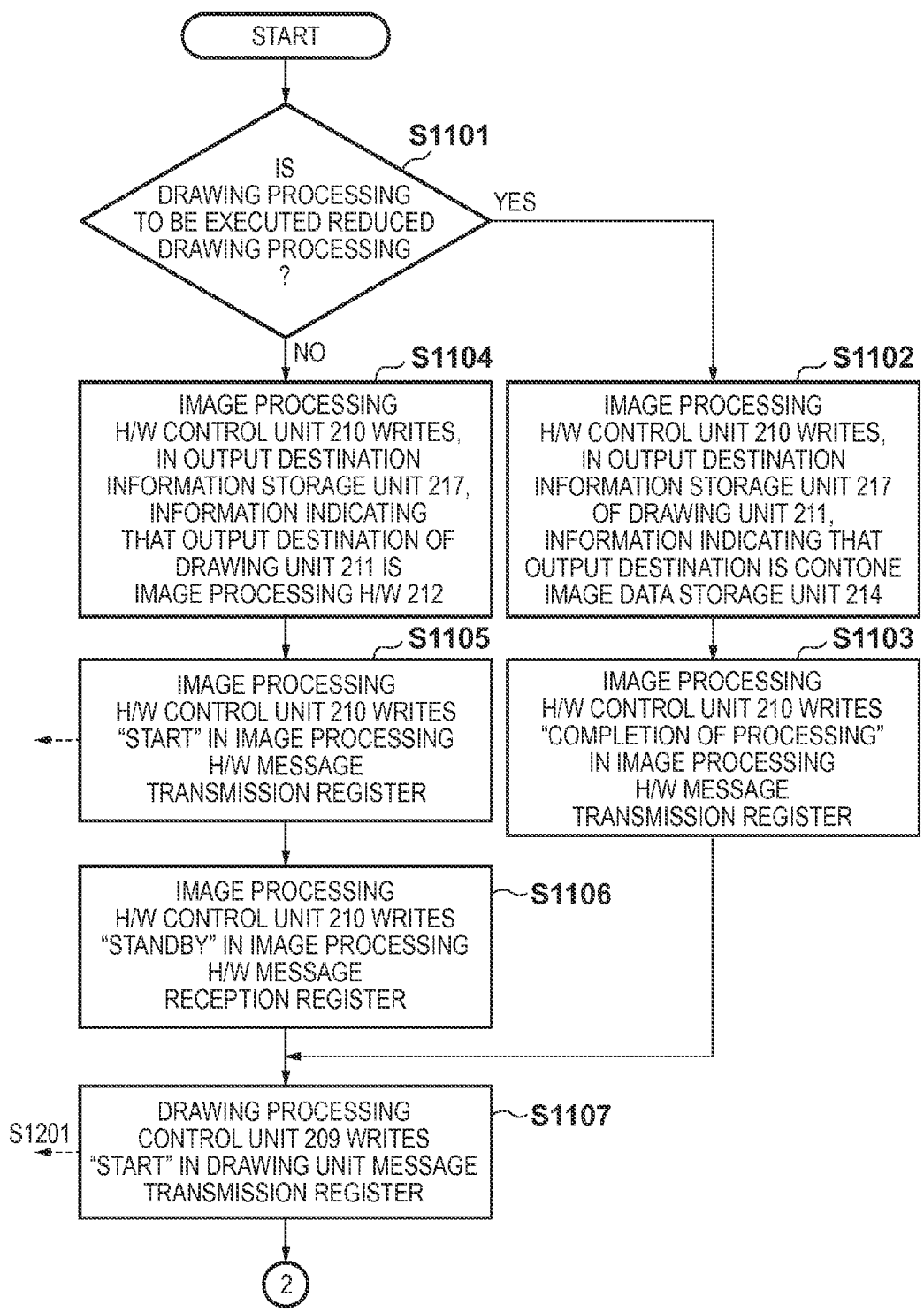

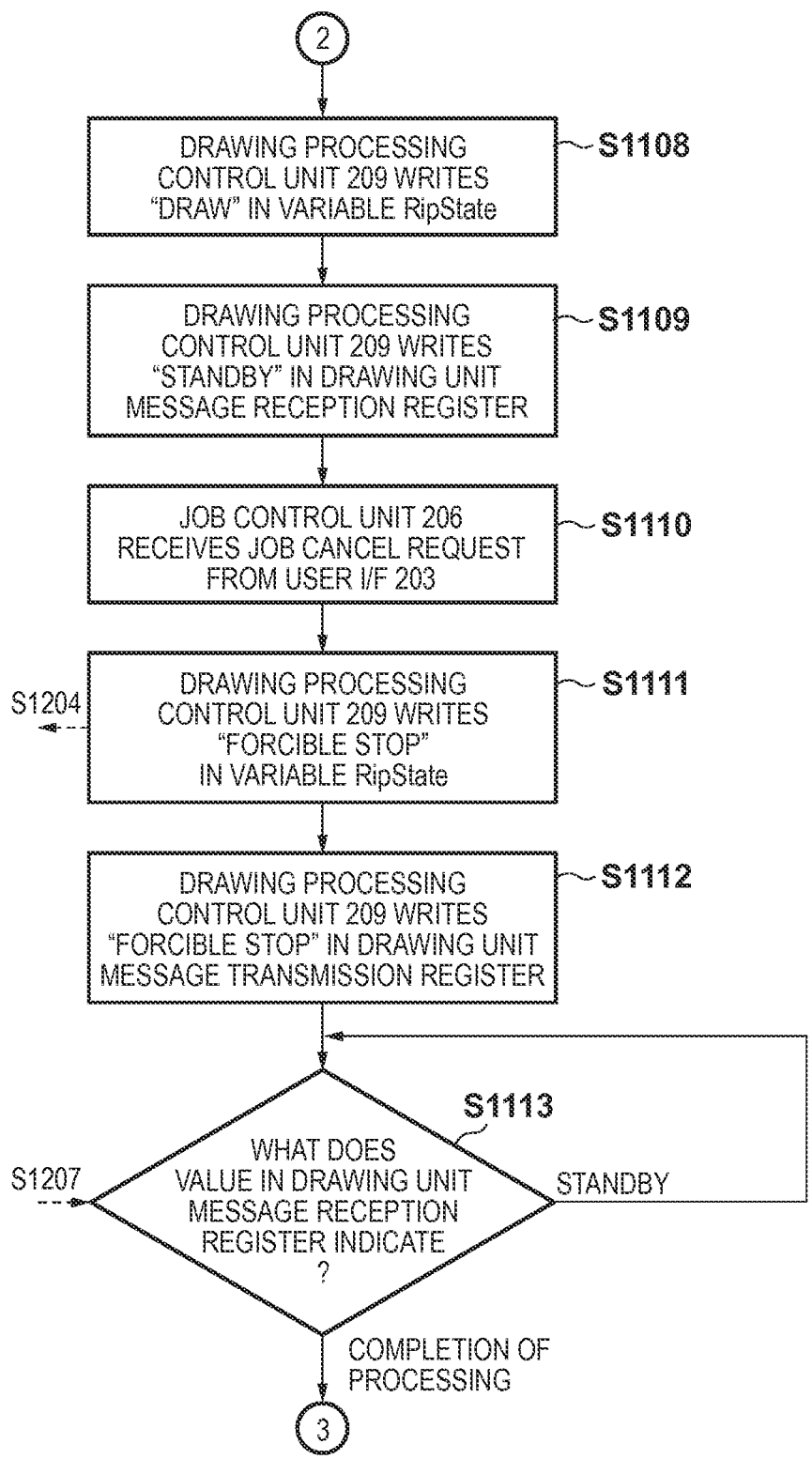

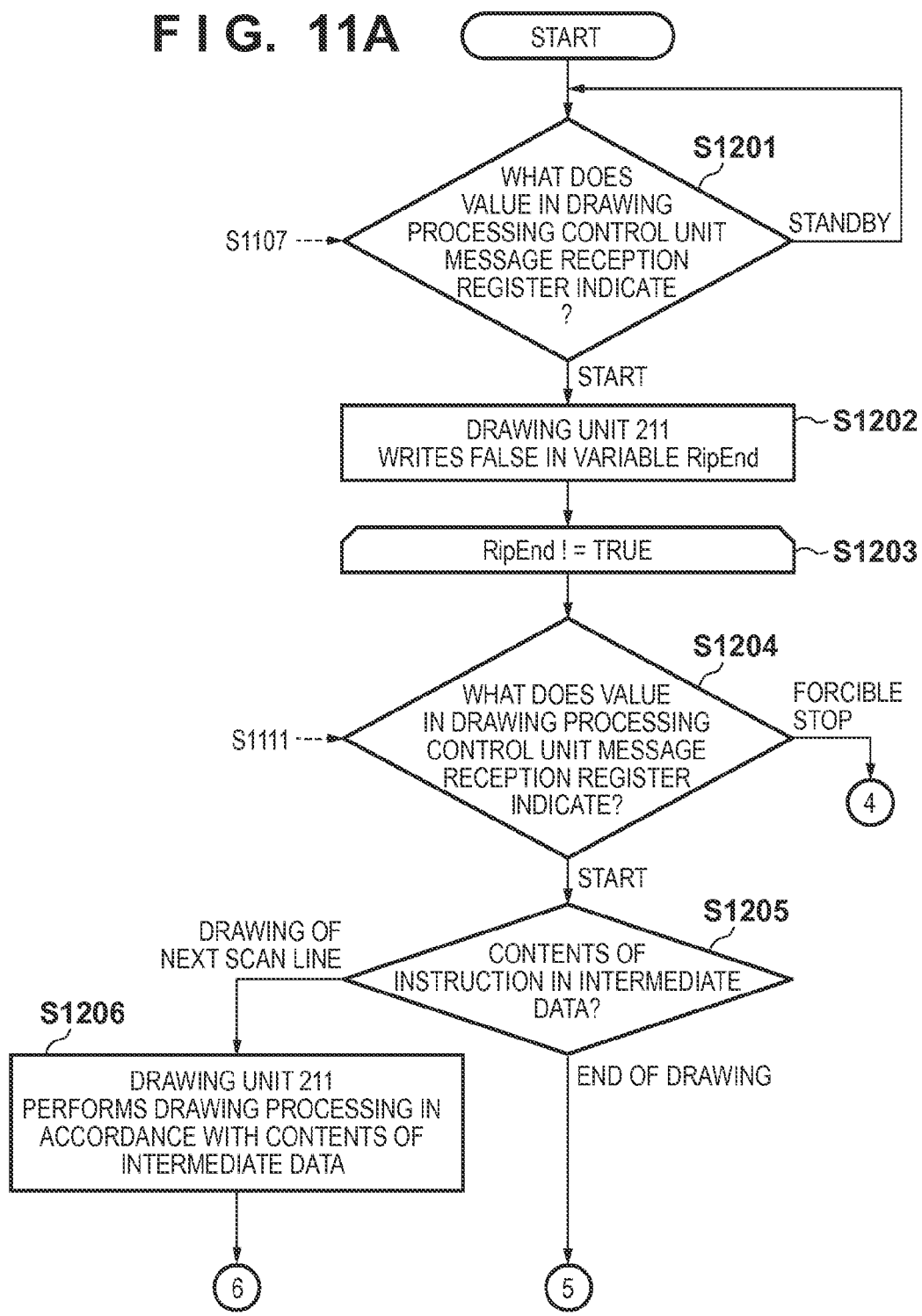

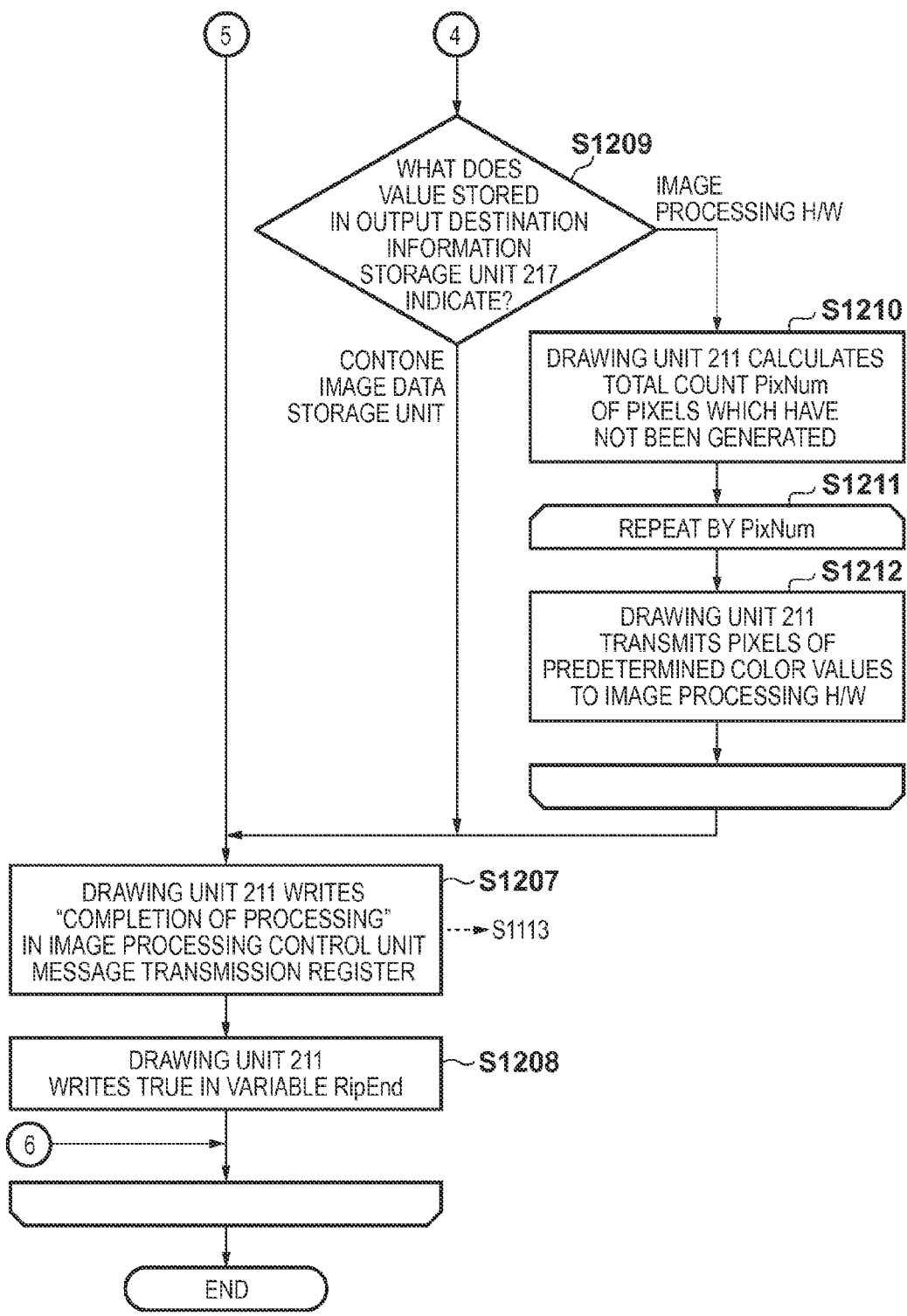
F I G. 11B

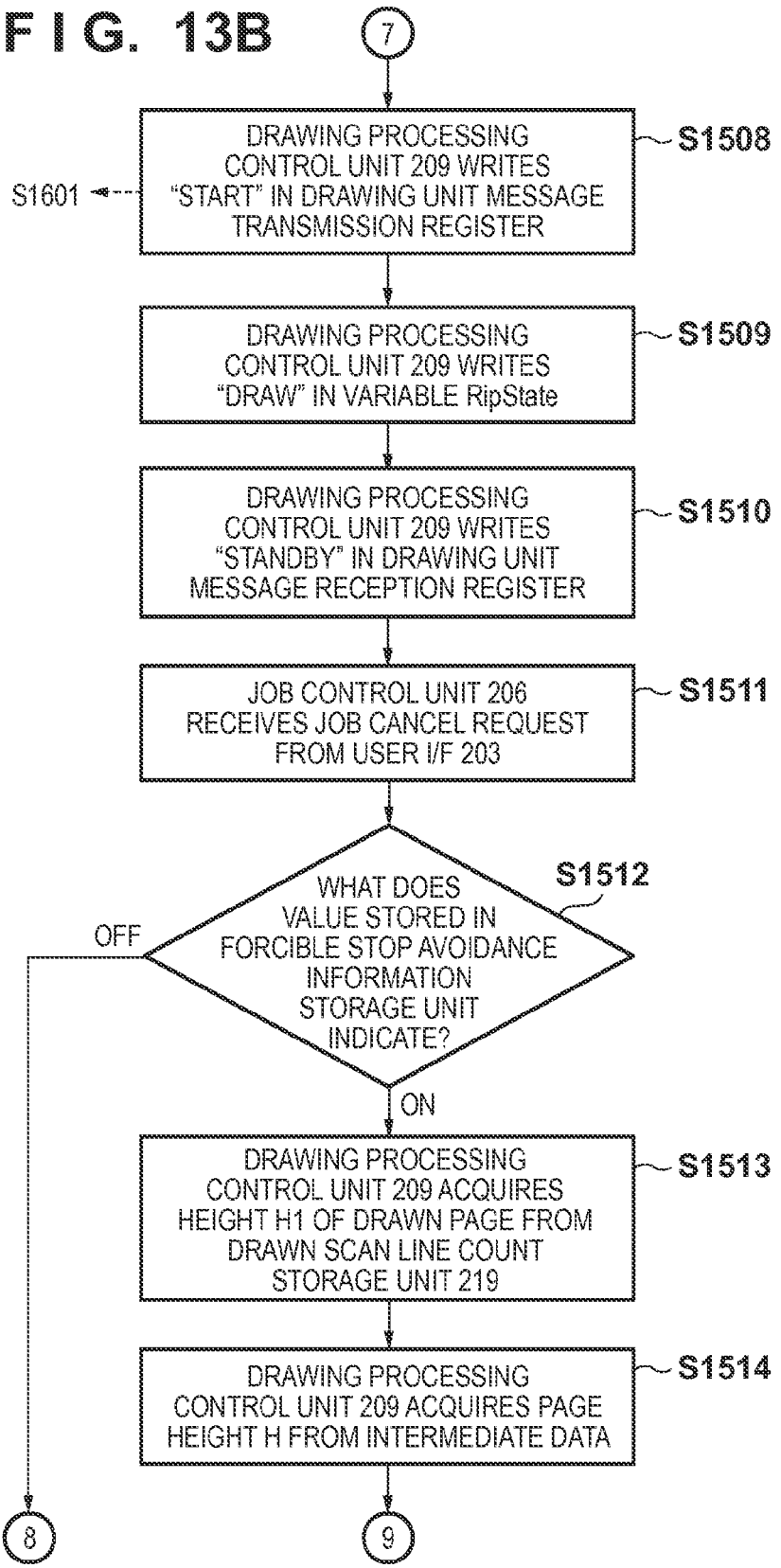

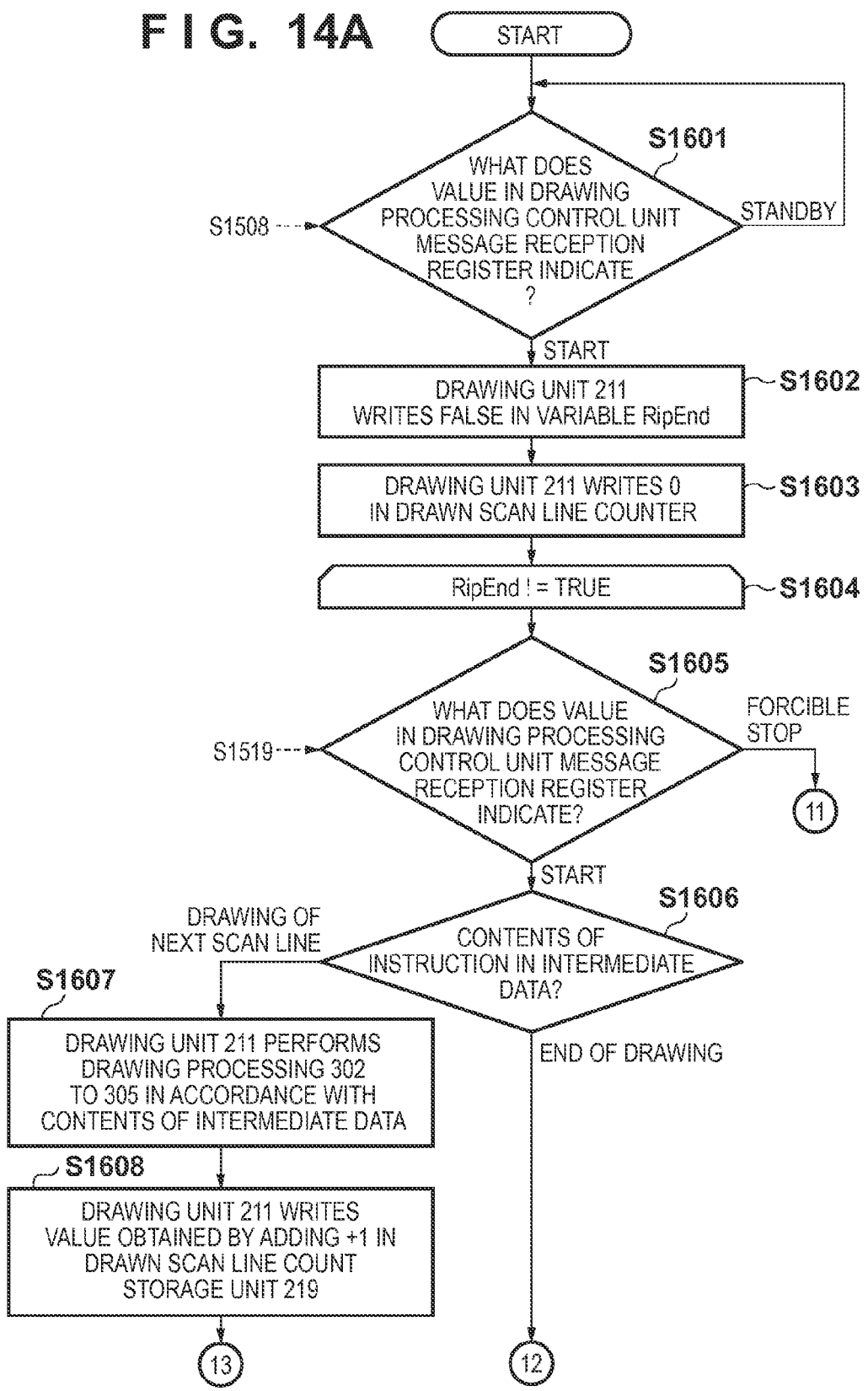

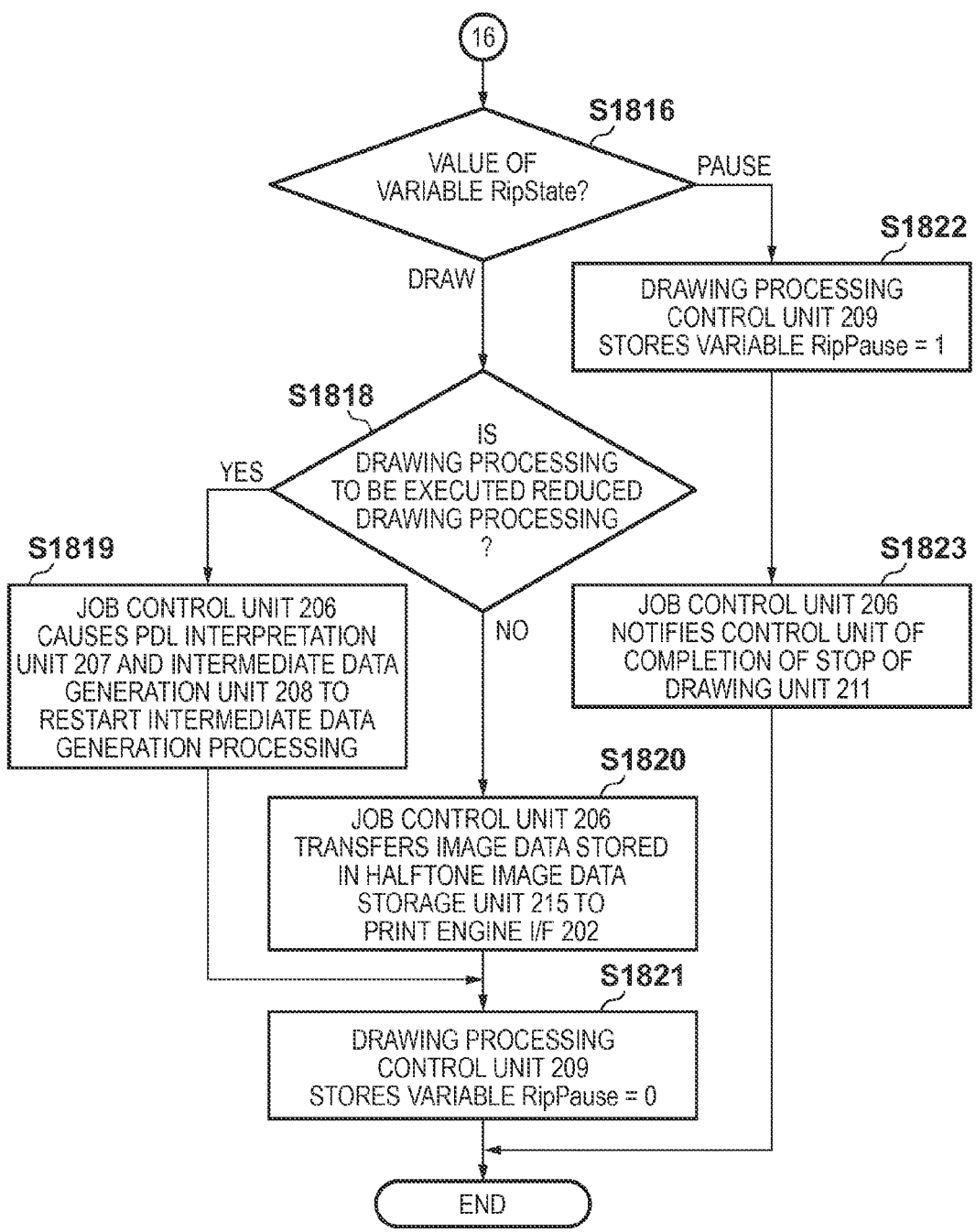

F I G. 16F
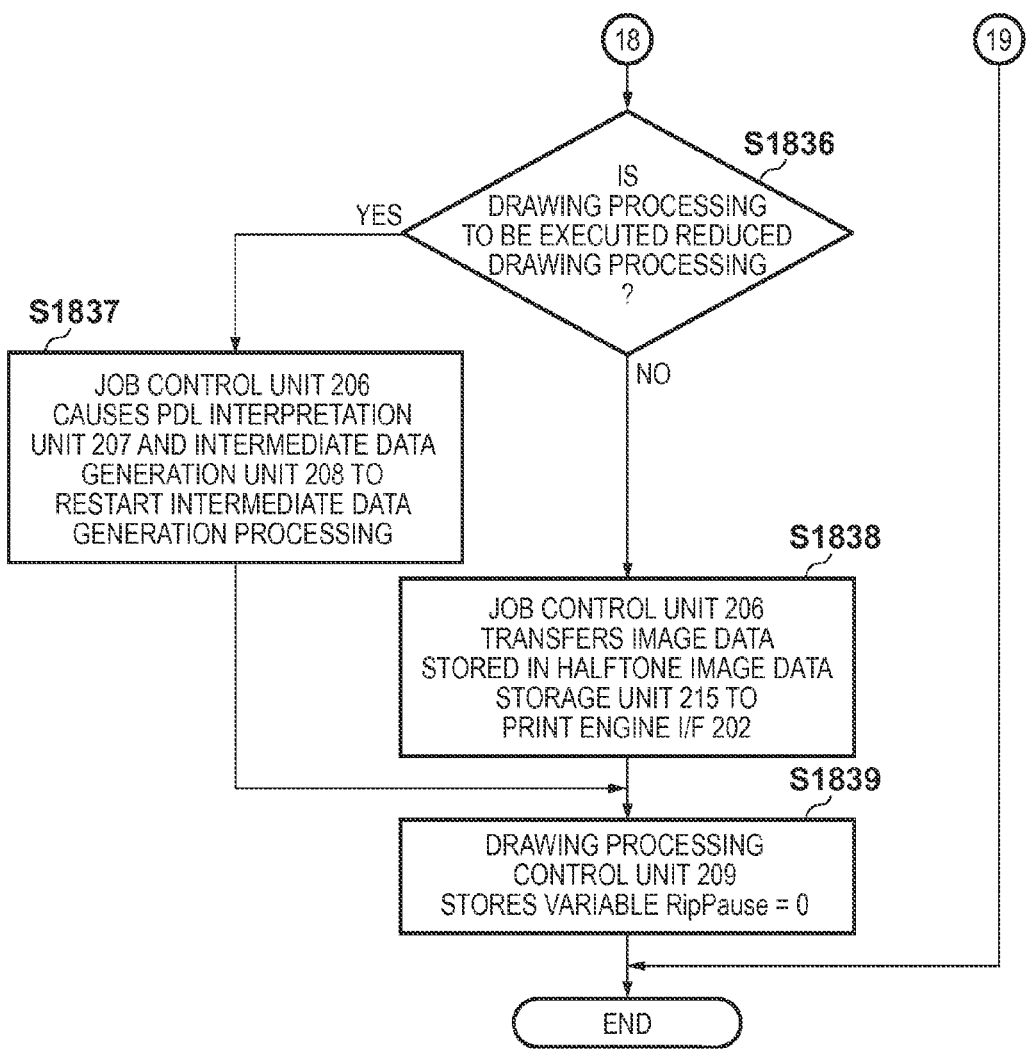

ns generation of the pixel data when the image processing unit is configured to be stopped.

IMAGE FORMING APPARATUS, CONTROL METHOD AND COMPUTER-READABLE MEDIUM FOR STOPPING A PRINT JOB DURING PRINTING BY A PRINTER

BACKGROUND OF THE INVENTION

1. Field of the Invention

The present invention relates to an image forming apparatus, a control method, and a computer-readable medium and, more particularly, to a forcible stopping method of forcibly stopping a print job during the execution of the print job by a printer.

2. Description of the Related Art

When a user transmits a job cancel request to a printer, each module in the printer forcibly stops the processing currently being executed. In this case, in some image processing modules, a control module needs to initialize a memory area in which image data which has already been output is stored, when executing a forcible stop. This makes it necessary to generate a new control sequence for a forcible stop. Accordingly, this complicates control associated with the printer, especially memory management. As a consequence, the serviceability of the control module of the printer may deteriorate.

As a result of the above background, some image processing modules in the printer cannot be forcibly stopped until the completion of a series of operations even if a user transmits a job cancel request to the printer. Japanese Patent Laid-Open No. 2003-256179 discloses a stopping method for modules which cannot be forcibly stopped, which performs discard processing inside an image processing module when the image processing module cannot be forcibly stopped and the device on the subsequent stage has already been stopped. According to this technique, when a drawing unit is connected in series with an image processing module on the subsequent stage, the image processing module cannot be stopped until the completion of drawing processing by the drawing unit based on intermediate data. Furthermore, the time taken for the processing by the drawing processing module depends on the processing defined by intermediate data. It is likely that the user will execute job cancellation as the processing of print data takes time. That is, a job which is likely to be the one for which job cancellation is executed takes much time for completion of job cancellation.

In an arrangement in which a drawing processing module is connected in series with an image processing module which cannot be forcibly stopped, while the drawing processing module and the image processing module are executed at the time of print processing, it is not possible to forcibly stop the modules in accordance with job cancel requests from the user. For this reason, in some cases, it takes much time for the printer to complete job cancellation in response to a job cancel request from the user. This impairs the convenience to the user.

SUMMARY OF THE INVENTION

The present invention allows the drawing unit to complete a forcible stop at high speed within a predetermined period of time. This makes it possible to instantaneously cope with a job cancel request from the user, thereby improving the convenience of the printer to the user.

According to one aspect of the present invention, there is provided an image forming apparatus including a drawing unit which generates pixel data based on print data and an image processing unit which performs image processing for the pixel data, the apparatus comprising: a determination unit configured to determine, while the drawing unit and the image processing unit are performing processing, whether the image processing unit as an output destination of pixel data generated by the drawing unit is configured to be stopped when receiving a stop instruction for the processing from a control unit; and a transmission unit configured to transmit pixel data of predetermined color values to the image processing unit for the number of pixels which have not been processed in processing of generating the pixel data by the drawing unit when the determination unit determines that the image processing unit is not configured to be stopped, wherein the image processing unit performs image processing by using pixel data of the predetermined color values transmitted by the transmission unit.

According to another aspect of the present invention, there is provided an image forming apparatus including a drawing unit configured to generate pixel data based on print data and an image processing unit configured to perform image processing for the pixel data, the apparatus comprising: a first determination unit configured to determine, while the drawing unit and the image processing unit are performing processing, whether to stop the processing, when receiving a stop instruction for the processing from a control unit, in accordance with a state of process of the processing for the print data in the drawing unit at a time point when the stop instruction is received; a second determination unit configured to determine whether the image processing unit as an output destination of pixel data generated by the drawing unit is configured to be stopped, when the first determination unit determines to stop the processing; and a transmission unit configured to transmit pixel data of predetermined color values to the image processing unit for the number of pixels which have not been processed in processing of generating the pixel data by the drawing unit when the second determination unit determines that the image processing unit is not configured to be stopped, wherein the image processing unit performs image processing by using pixel data of the predetermined color values transmitted by the transmission unit.

According to another aspect of the present invention, there is provided an image forming apparatus including a drawing unit configured to generate pixel data based on print data and an image processing unit configured to perform image processing for the pixel data, the apparatus comprising: a holding unit configured to hold, while the drawing unit and the image processing unit are performing processing, pixel data processed immediately before reception of a pause instruction for the processing from a control unit and position information of pixels which have not been processed in processing of generating the pixel data by the drawing unit when receiving the pause instruction; a determination unit configured to determine whether the image processing unit as an output destination of pixel data generated by the drawing unit is configured to be stopped, when receiving the pause instruction; a first transmission unit configured to transmit pixel data of predetermined color values to the image processing unit by the number of pixels which have not been processed in processing of generating the pixel data by the drawing unit, when the determination unit determines that the image processing unit is not configured to be stopped; and a second transmission unit configured to transmit the predetermined color values to the image processing unit by the number of pixels included in print data held by the holding unit and have undergone drawing processing, after the image forming apparatus returns from a pause, wherein the drawing unit continues drawing processing based on the position information held by the holding unit after the image forming apparatus returns from the pause.

According to another aspect of the present invention, there is provided a control method for an image forming apparatus including a drawing unit configured to generate pixel data based on print data and an image processing unit configured to perform image processing for the pixel data, the method comprising: a determination step of determining, while the drawing unit and the image processing unit are performing processing, whether the image processing unit as an output destination of pixel data generated by the drawing unit is configured to be stopped when receiving a stop instruction for the processing from a control unit; and a transmission step of transmitting pixel data of predetermined color values to the image processing unit for the number of pixels which have not been processed in processing of generating the pixel data by the drawing unit when it is determined in the determination unit that the image processing unit is not configured to be stopped, wherein the image processing unit performs image processing by using pixel data of the predetermined color values transmitted in the transmission step.

According to another aspect of the present invention, there is provided a computer-readable medium storing a program for causing a computer to function as a determination unit configured to determine, while a drawing unit and an image processing unit are performing processing, whether the image processing unit as an output destination of pixel data generated by the drawing unit is configured to be stopped when receiving a stop instruction for the processing from a control unit; and a transmission unit configured to transmit pixel data of predetermined color values to the image processing unit for the number of pixels which have not been processed in processing of generating the pixel data by the drawing unit when the determination unit determines that the image processing unit is not configured to be stopped, wherein the image processing unit functions to perform image processing by using pixel data of the predetermined color values transmitted by the transmission unit.

Further features of the present invention will become apparent from the following description of exemplary embodiments (with reference to the attached drawings).

BRIEF DESCRIPTION OF THE DRAWINGS

FIGS. 6A and 6B are flowcharts showing a control processing procedure associated with drawing processing;

FIG. 7 is a flowchart showing a drawing processing sequence;

FIG. 8 is a view showing an outline of processing according to the first embodiment;

FIGS. 10A, 10B, and 10C are flowcharts showing control processing for drawing processing according to the first embodiment;

FIGS. 11A and 11B are flowcharts showing drawing processing according to the first embodiment;

FIGS. 13A, 13B, 13C, and 13D are flowcharts showing control processing for drawing processing according to the second embodiment;

FIGS. 14A and 14B are flowcharts showing drawing processing according to the second embodiment;

FIGS. 16A, 16B, 16C, 16D, 16E, and 16F are flowcharts showing control processing for drawing processing according to the third embodiment.

DESCRIPTION OF THE EMBODIMENTS

[System Arrangement]

Figure 1:
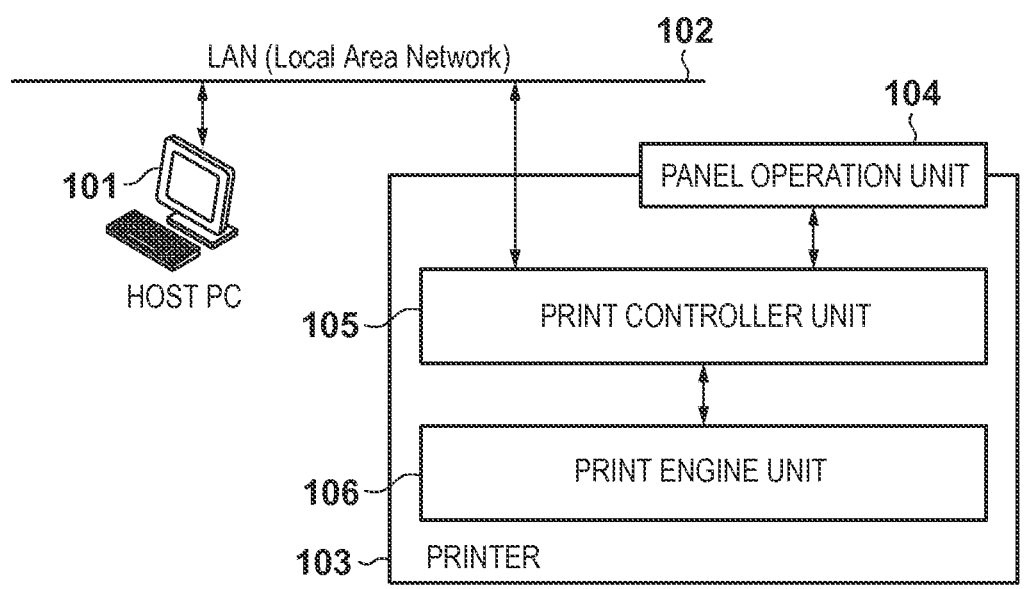
FIG. 1 is a block diagram showing an outline of a print system.

The embodiments of the present invention will be described below with reference to the accompanying drawings. FIG. 1 shows an example of a print system which is applied to the present invention. The print system includes a host PC 101 as an information processing apparatus, a LAN (Local Area Network) 102, and a printer 103 as an image forming apparatus. The host PC 101 is connected to the printer 103 via the LAN 102. Although not shown in FIG. 1, the print system may include other apparatuses. The printer 103 performs print processing based on the print data transmitted by the user from the host PC 101 via the LAN 102. The printer 103 includes a panel operation unit 104 as a user interface. The panel operation unit 104 allows the user to issue, for example, instructions to cancel a print job and select a paper feed tray. Upon receiving a print instruction from the user via the host PC 101, a print controller unit 105 performs image processing for the formation of an image for print data transmitted together with the print instruction. The image data formed at this time is sent to a print engine unit 106. The print engine unit 106 fixes the toner on a paper medium based on the image data, and performs paper delivery processing. Note that print data to be used in this case is not limited to that received from the host PC 101 and may be data which is held in other apparatus and acquired based on a print instruction from the user. In addition, this embodiment will be described on the premise that print data is defined by the PDL (Print Description Language) format. However, the present invention is not limited to this.

Figure 2:
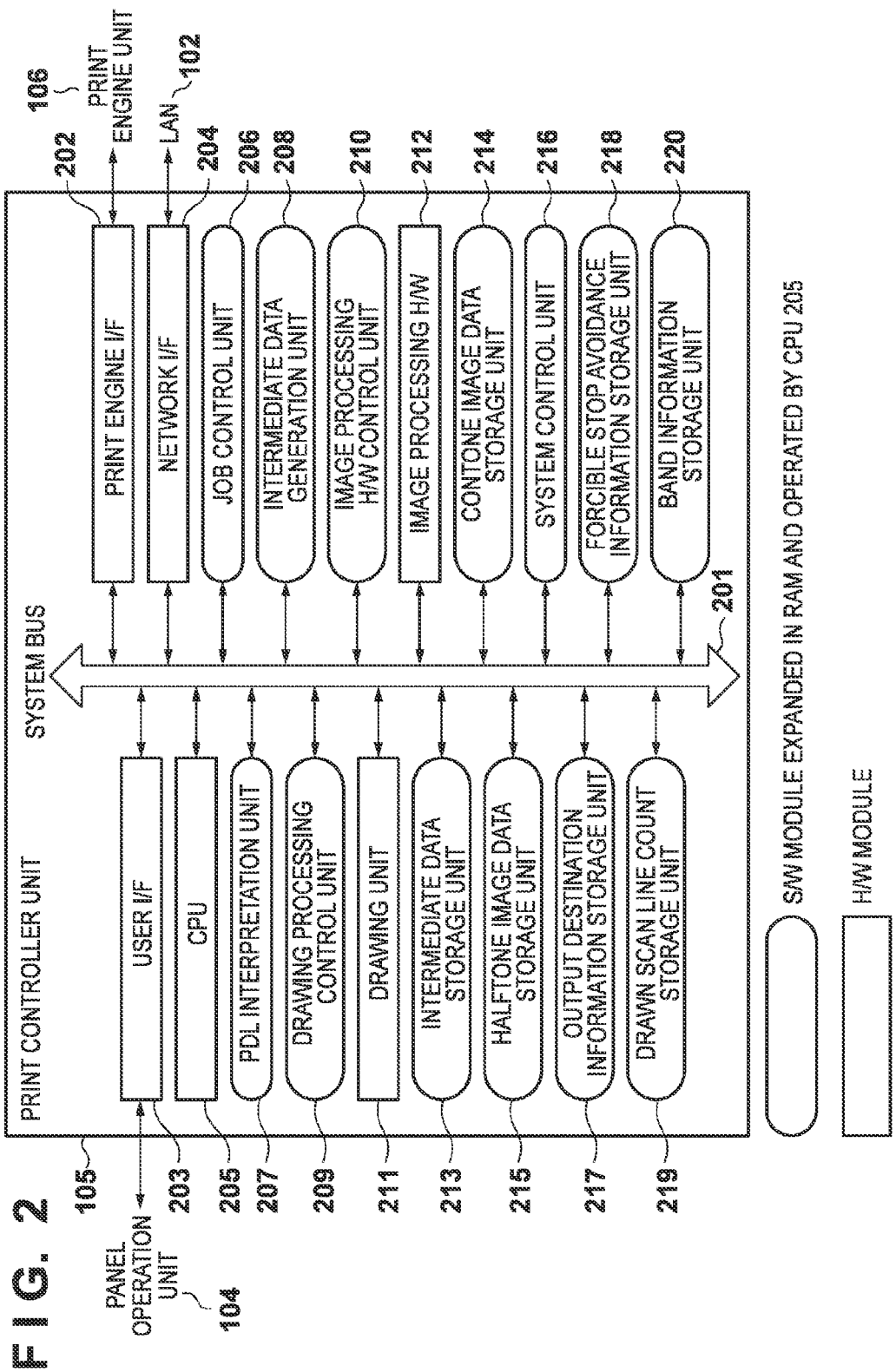
FIG. 2 is a block diagram showing an outline of the inner arrangement of a print controller.

FIG. 2 shows an example of the arrangement of the print controller unit 105 including the printer 103. First of all, various kinds of modules inside the print controller unit 105 are connected to each other via a system bus 201. I/Fs which handle data input/output processing with external modules include a print engine I/F 202, a user I/F 203, and a network I/F 204. The print engine I/F 202 is an I/F for data communication between the print engine unit 106 and the print controller unit 105. The image data generated by the print controller unit 105 is sent to the print engine unit 106 via the print engine I/F 202. The user I/F 203 is an I/F for data communication between the panel operation unit 104 and the print controller unit 105. The instruction contents designated by the user with the panel operation unit 104 are sent to the print controller unit 105 via the user I/F 203. The network I/F 204 is an I/F for data communication between the host PC 101 and the printer controller via the LAN 102. The print instruction designated by the user with the host PC 101 is sent to the inside of the print controller unit 105 via the network I/F 204.

A CPU (Central Processor Unit) 205 is in charge of partial or entire control processing and image processing in the print controller unit 105. A job control unit 206 is in charge of control of a series of print jobs up to the transfer of image data to the print engine I/F 202 based on print data sent from the network I/F 204 to the inside of the print controller unit 105. In the print controller unit 105, upon receiving print data from the network I/F 204, the job control unit 206 causes a PDL interpretation unit 207 to interpret the contents of the print data. The contents of the print data interpreted by the PDL interpretation unit 207 are sent to an intermediate data generation unit 208. The intermediate data generation unit 208 generates intermediate data required for drawing processing which can be interpreted by a drawing unit 211 based on the interpretation result of the print data performed by the PDL interpretation unit 207, and sequentially stores the resultant data in an intermediate data storage unit 213.

When the intermediate data storage unit 213 stores intermediate data of one page, the job control unit 206 causes the drawing unit 211 to generate contone image data (continuous tone image data) based on the intermediate data stored in the intermediate data storage unit 213. A halftone image data storage unit 215 stores, via image processing H/W 212 basically serving as an image processing unit, the image data generated by a drawing processing control unit 209 and the drawing unit 211. Alternatively, such data is exceptionally stored in a contone image data storage unit 214. When the drawing unit 211 is to perform reduced drawing processing, the contone image data storage unit 214 stores the image data generated by the drawing unit 211.

In this case, reduced drawing processing is the drawing processing of generating contone image data using the intermediate data which has already been stored in the intermediate data storage unit 213 when the intermediate data generated by the intermediate data generation unit 208 reaches the upper limit of the capacity of the intermediate data storage unit 213. Performing reduced drawing processing will convert the intermediate data stored in the intermediate data storage unit 213 into contone image data, which is stored in the contone image data storage unit 214. This generates a free space in the intermediate data storage unit 213 to allow the intermediate data generation unit 208 to continue the generation of intermediate data. The image generated by reduced drawing processing is stored in the contone image data storage unit 214 and then is embedded in the intermediate data generated after the occurrence of reduced drawing processing. It is necessary to hold the image data generated by reduced drawing processing in this manner in a contone image because it is used again in drawing processing. The contone image data storage unit 214 therefore holds this image data. Subsequently, at the time of generation of contone image data, drawing processing which is not reduced drawing processing will be referred to as "normal drawing processing" to be distinguished from reduced drawing processing.

When storing image data in the contone image data storage unit 214 and the halftone image data storage unit 215, this apparatus stores the data for each band obtained by vertically dividing an image of a page size into several parts with a predetermined height. Assume that a band is constituted by a plurality of scan lines, and the number of scan lines (height) of each band is defined in advance. This is because the unit of processing in image processing performed by the image processing H/W 212 is a band, and it is not possible to secure a continuous area of one page in the memory. Note that an output destination information storage unit 217 stores information indicating whether to execute reduced drawing, which determines the destination to which the drawing unit 211 is to output information.

In addition, the drawing unit 211 is implemented by dedicated H/W, and the drawing processing control unit 209 is provided to control the drawing unit 211. Likewise, an image processing H/W control unit 210 is provided to control the image processing H/W 212. A system control unit 216 is a basic unit for making the print controller unit 105 function as a system, and often indicates an OS (Operating System). When, for example, the user wants to acquire the time, he/she acquires it from the system control unit 216. In addition, for example, the system control unit 216 performs control to determine whether to shift the printer 103 to the power saving mode of suppressing the supply of power to hardware except for the CPU 205 and the memory.

Although described in detail later, a forcible stop avoidance information storage unit 218 stores the information set by the user using the panel operation unit 104, which is acquired via the user I/F 203. A drawn scan line count storage unit 219 stores count information indicating the number of scan lines which have already been drawn. A band information storage unit 220 stores information indicating a height per band. Referring to FIG. 2, the S/W modules and H/W modules which are expanded in the RAM (not shown) and operate on the CPU 205 are separately arranged. However, the present invention is not physically limited to this arrangement.

[Processing Procedure in Drawing Unit]

Figure 3:
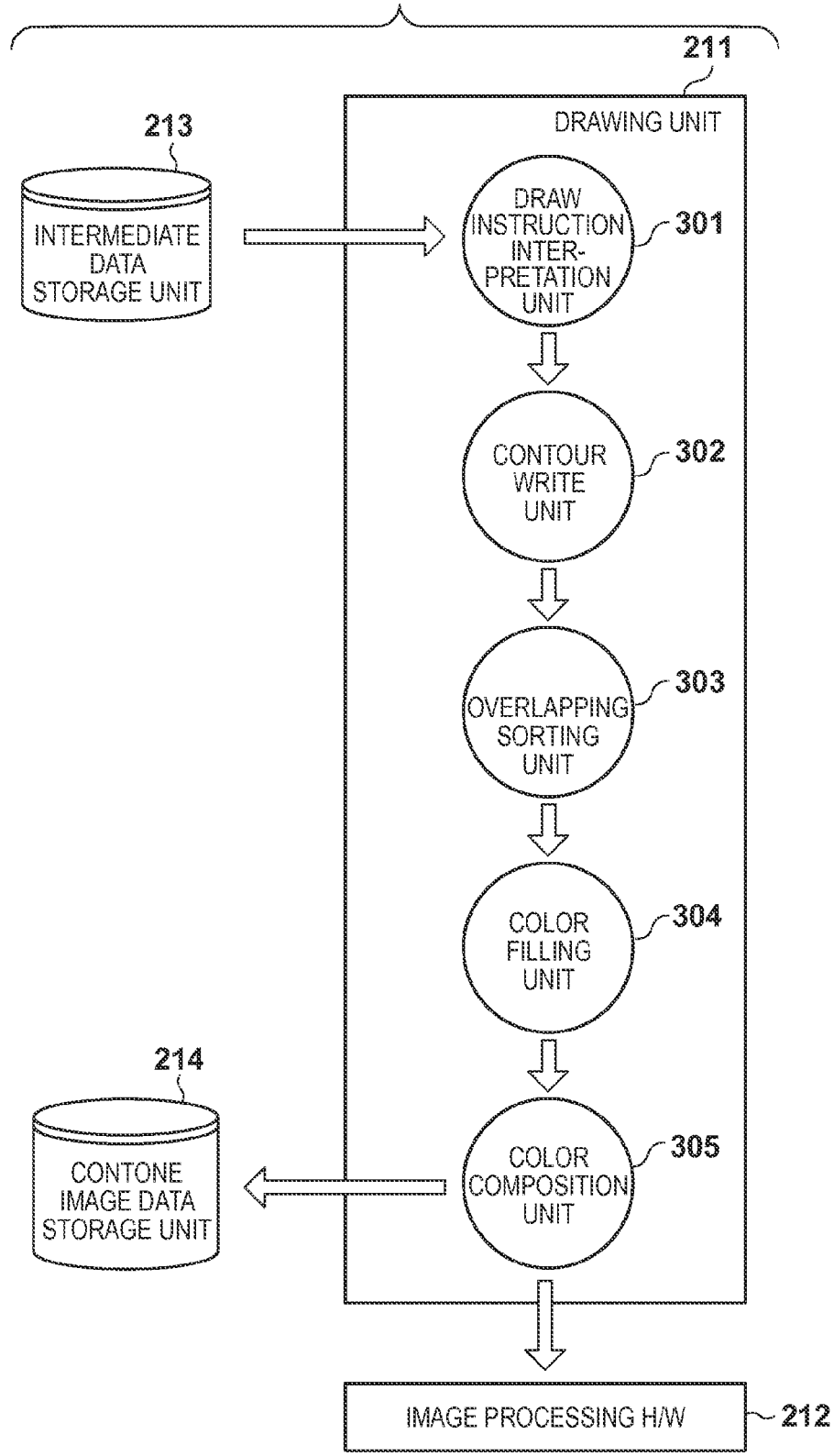
FIG. 3 is a block diagram showing an outline of drawing processing.

FIG. 3 shows an outline of a processing procedure executed by the drawing unit 211. The drawing unit 211 receives intermediate data from the intermediate data storage unit 213 as input data and outputs a pixel output of image data via an instruction interpretation unit 301, a contour write unit 302, an overlapping sorting unit 303, a color filling unit 304, and a color composition unit 305. That is, the drawing unit 211 generates pixel data. The instruction interpretation unit 301 determines the contents of an instruction to be executed by the drawing unit 211 according to the contents of intermediate data. For example, the contents interpreted and determined by the instruction interpretation unit 301 include an instruction to execute drawing processing for the next scan line and an instruction to finish drawing processing itself. In this case, a scan line indicates the unit of processing which can be executed in one drawing processing operation ranging from operation by the contour write unit 302 to operation by the color composition unit 305 in the drawing unit 211. That is, a page size is constituted by one or more scan lines. In addition, a scan line with a value of 1 indicates image data in terms of page size, which has a height of 1 and the same width as that of a page.

When the instruction interpretation unit 301 determines that an instruction written in intermediate data is an instruction to execute drawing processing for the next scan line, the drawing unit 211 executes processing ranging from operation by the contour write unit 302 to operation by the color composition unit 305. The contour write unit 302 acquires contour information from each drawing object included in intermediate data. In this case, contour information indicates two pieces of information including the start position and contour width of the contour of the drawing object. Upon acquiring contour information corresponding to one scan line of image data, the contour write unit 302 sends contour coordinate information to the overlapping sorting unit 303. The overlapping sorting unit 303 performs sorting processing to arrange drawing objects in a proper order with respect to the surface of a sheet based on the contour coordinate information and the overlapping relationship between the drawing objects. Upon generating sorted contour information corresponding to one scan line of image data, the overlapping sorting unit 303 sends the information to the color filling unit 304.

The color filling unit 304 adds color information to each section of the sorted contour information which is delimited by a contour. When adding photographic data to a section delimited by a contour instead of color information, the color filling unit 304 expands the photographic data. When generating sorted contour information to which color information is added by an amount corresponding to one scan line, the color filling unit 304 sends the information to the color composition unit 305. The color composition unit 305 applies an overlapping rule complying with intermediate data to the overlapping portion between an area delimited by a contour and an area delimited by another contour based on the sorted contour information to which the color information is added.

Overlapping rules include, for example, ROP (Raster OPerator) and Alpha Blend. ROP is logical operation to be performed between bits expressing color values on the front surface side and rear surface side of the overlapping portion between areas. When designating ROP as an overlapping rule, the color composition unit 305 outputs the result obtained by logical operation between color values expressing areas on the front surface side and the rear surface side. Alpha Blend is the designation of the color value ratio between the front surface side and the rear surface side in color mixing when outputting the color obtained by mixing colors on the front surface side and the rear surface side.

The color composition unit 305 decides what kind of color is to be output from the color values of the front surface area and rear surface area in the overlapping area by applying the overlapping rule. The result obtained by the color composition unit 305 is output as the respective pixels of the image data. As described above, the contone image data storage unit 214 or the image processing H/W 212 is selected as the output destination of the drawing unit 211. That is, when outputting pixels having undergone reduced drawing processing, the contone image data storage unit 214 is selected as the output destination of the drawing unit 211. When outputting pixels having undergone normal drawing processing, the image processing H/W 212 is selected.

[Panel Operation Unit]

Figure 4A:
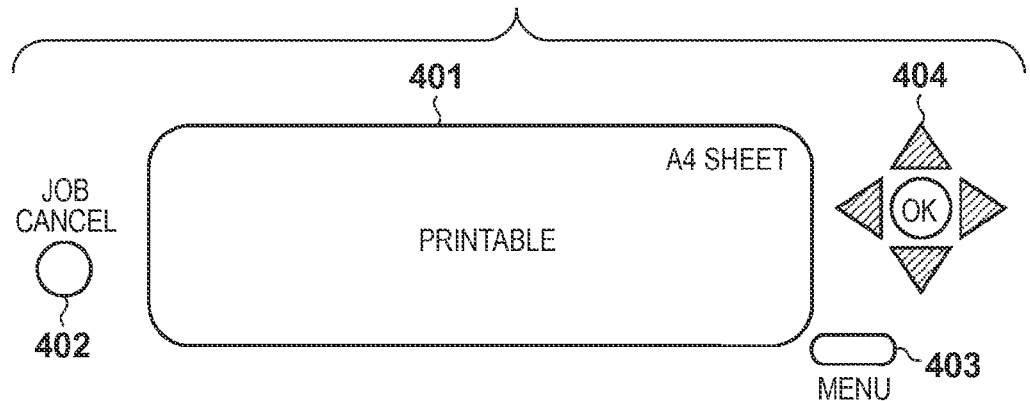
FIGS. 4A, 4B, and 4C each are views showing an example of a panel operation unit.

FIG. 4A shows an example of the panel operation unit 104. A display unit 401 displays the information set in the printer 103 and the items which the user wants to set in the printer, thereby visually providing the information to the user. When the display unit 401 displays "printing", the user can forcibly stop the print job currently processed in the printer 103 by pressing a job cancel button 402. When the user presses a menu button 403, the display unit 401 displays the items that the user can set and information inside the printer 103 that the user can check and select. Upon pressing the menu button 403, the user can select a desired item in the menu displayed on the display unit 401 with a selection button 404. This implements a reception unit which receives instructions from the user.

[Normal Drawing Processing and Image Processing Sequences]

Figure 5:
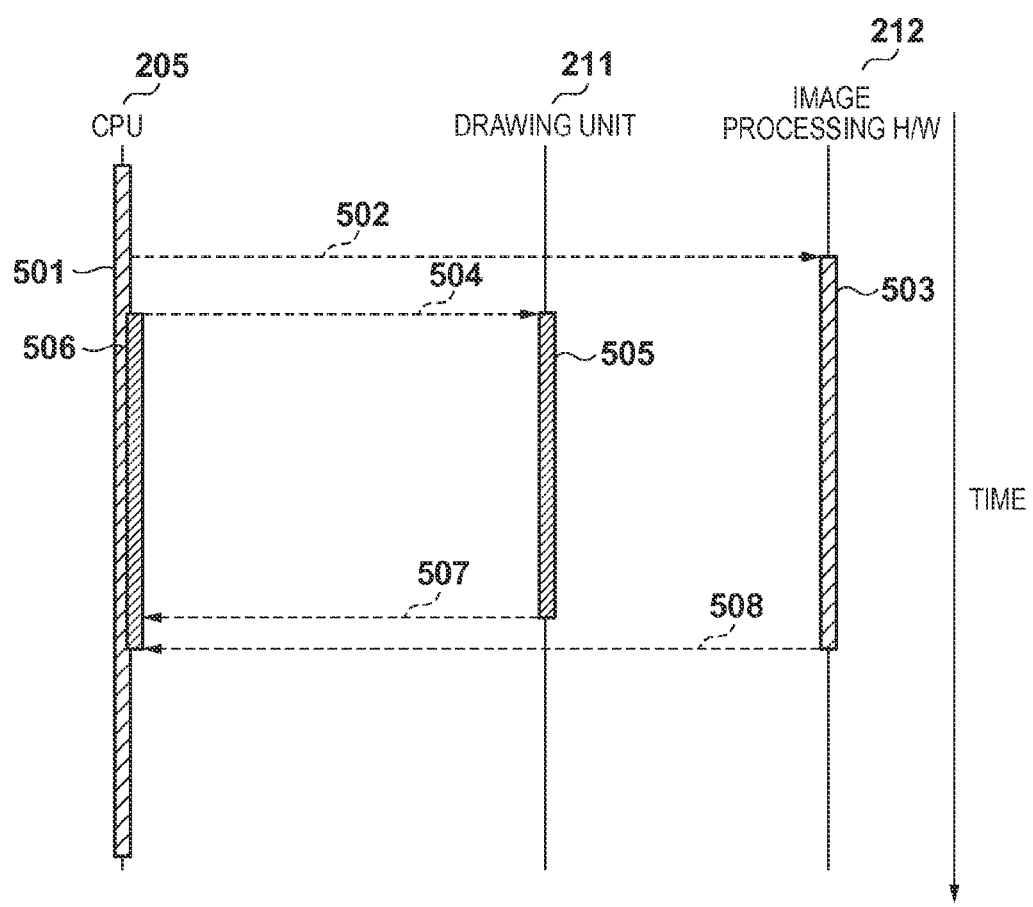
FIG. 5 is a sequence chart showing an outline of processing from the start to the end in a drawing unit.

FIG. 5 shows a sequence from the start to end of normal drawing processing in the drawing unit 211, and a sequence from the start to end of image processing in the image processing H/W 212. A period 501 indicates a period during which the CPU 205 drives. When the printer 103 performs normal drawing processing, first of all, the CPU 205 transmits a message 502 to the image processing H/W 212 in the period 501 to make the image processing H/W 212 be ready for image processing. In this case, more specifically, transmitting a message is equivalent to writing a predetermined value in a predetermined register or memory.

When the CPU 205 transmits the message to the image processing H/W 212, the image processing H/W 212 is made to be ready for execution of image processing. This allows the image processing H/W 212 to receive contone pixel data from the drawing unit 211 and output halftone pixel data. A period 503 indicates a period during which the image processing H/W can execute image processing. The image processing H/W 212 receives the last contone pixel data sent from the drawing unit 211, and outputs halftone pixel data, thereby completing image processing.

The CPU 205 detects the completion of image processing by the image processing H/W 212 by receiving a message 508 from the image processing H/W 212. In this case, more specifically, receiving a message is equivalent to reading a predetermined value from a predetermined register or memory.

After transmitting the message 502 to the image processing H/W 212, the CPU 205 transmits a message 504 indicating the start of drawing of intermediate data to the drawing unit 211. This causes the drawing unit 211 to perform drawing processing. A period 505 indicates a period during which the drawing unit 211 executes drawing processing. The drawing unit 211 completes the processing by reading drawing end information from the intermediate data. The CPU 205 detects that the drawing unit 211 has completed the drawing processing by receiving a message 507 from the drawing unit 211. A period 506 is a period during which the CPU 205 waits for the completion of drawing processing. When completely storing image data in the halftone image data storage unit 215, the CPU 205 transfers the halftone image to the print engine unit 106. Therefore, the period during which the CPU 205 waits for the completion of drawing processing ranges from the time point when the CPU 205 transmits the message 504 to the time point when the CPU 205 receives the message 508.

[Normal Drawing processing and Image Processing Procedures]

Figure 6B:
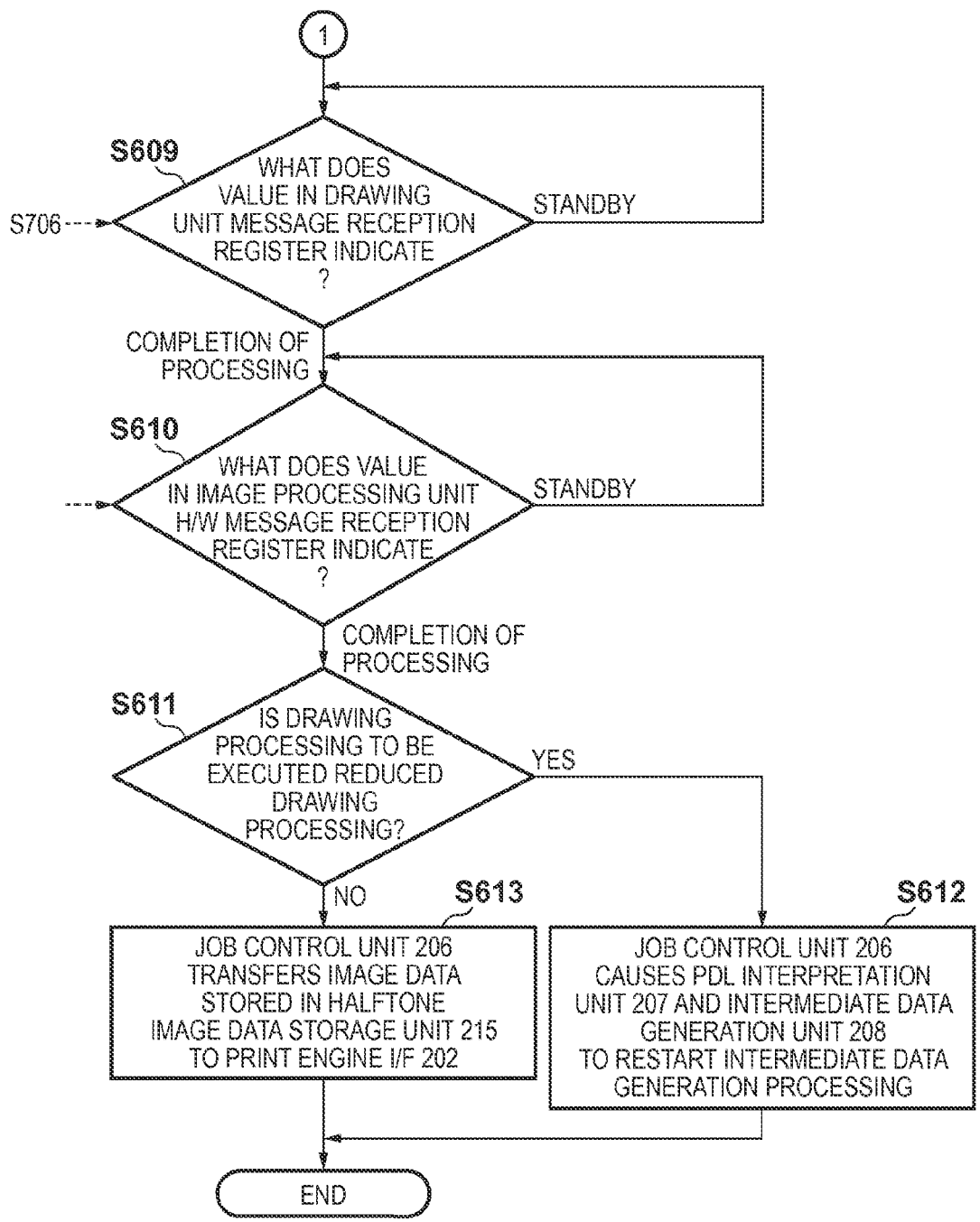

FIGS. 6A and 6B are flowcharts showing processing executed by the CPU 205, including processing from the start to end of normal drawing processing in the drawing unit 211 and processing from the start to end of image processing in the image processing H/W 212. Note that the broken line arrows in the flowcharts of FIGS. 6A and 6B indicate correspondence with the processing shown in another drawing.

In step S601, the job control unit 206 determines whether the drawing processing to be executed from now is reduced drawing processing. The intermediate data generation unit 208 notifies the job control unit 206 of information for determining whether the drawing is reduced drawing processing, when the intermediate data generation unit 208 completely generates intermediate data used for one drawing processing operation in the intermediate data storage unit 213. If the job control unit 206 determines in step S601 that the drawing processing is reduced drawing processing (YES in step S601), the processing in steps S602 and S603 is executed. If the drawing processing is not reduced drawing processing but is normal drawing processing (NO in step S601), the processing from step S604 to step S606 is executed.

In step S602, the image processing H/W control unit 210 writes, in the output destination information storage unit 217 of the drawing unit 211, information indicating that the output destination is the contone image data storage unit 214. In step S603, the image processing H/W control unit 210 writes "completion of processing" in the image processing H/W message reception register in which the image processing H/W 212 writes message to the CPU 205. This operation prevents a deadlock in step S610 (to be described later), because the drawing unit 211 transmits no contone pixel data to the image processing H/W 212 when reduced drawing processing is to be performed. The process then advances to step S607.

In step S604, the image processing H/W control unit 210 writes, in the output destination information storage unit 217, information indicating that the output destination of the drawing unit 211 is the image processing H/W 212. In step S605, the image processing H/W control unit 210 writes "start" in the image processing H/W message transmission register. The processing in step S605 corresponds to the processing of the message 502 shown in FIG. 5. This readies the image processing H/W 212 for image processing. In step S606, the image processing H/W control unit 210 writes "standby" in the image processing H/W message reception register. The process then advances to step S607.

In step S607, the drawing processing control unit 209 writes "start" in the drawing unit message transmission register. The processing in step S607 corresponds to the message 504 shown in FIG. 5. This causes the drawing unit 211 to start drawing processing. In step S608, the drawing processing control unit 209 writes "standby" in the drawing unit message reception register. In step S609, the drawing processing control unit 209 stands by until the value of the drawing processing message reception register becomes "completion of processing". Upon checking that the value of the drawing unit message reception register becomes "completion of processing" in step S609, the process advances to step S610. The switching timing from "standby" to "completion of processing" in step S609 corresponds to the timing at which the message 507 shown in FIG. 5 is executed. In step S610, the image processing H/W control unit 210 stands by until the value of the image processing H/W message reception register becomes "completion of processing". Upon checking that the value of the image processing H/W message reception register becomes "completion of processing" in step S610, the process advances to step S611. The switching timing from "standby" to "completion of processing" in step S610 corresponds to the message 508 in FIG. 5.

In step S611, the job control unit 206 refers to the value stored in the output destination information storage unit 217. If the value indicates "contone image data storage unit" as a result of reference, the job control unit 206 determines that the drawing processing executed so far is "reduced drawing processing" (YES in step S611), and causes the PDL interpretation unit 207 and the intermediate data generation unit 208 to restart processing in step S612. If the referred value indicates "halftone image data storage unit", the job control unit 206 determines that the processing executed so far is "normal drawing processing" (NO in step S611), and transfers the image data stored in the halftone image data storage unit 215 to the print engine I/F 202 in step S613.

In the following description of the accompanying drawings, the drawing processing control unit message reception register and the drawing processing control unit message transmission register are respectively identical to the drawing unit message transmission register and the drawing unit message reception register. These terms will be selectively used in the description of the accompanying drawings depending on whether the CPU 205 plays a main role or the drawing unit 211 plays a main role.

[Drawing Processing Procedure]

FIG. 7 is a flowchart showing the processing to be executed by the drawing unit 211 in the interval from the start to end of drawing processing. Note that the broken line arrows in the flowchart of FIG. 7 indicate correspondence with the processing shown in another drawing.

In step S701, the drawing unit 211 stands by until the value stored in the drawing processing control unit message reception register becomes "start". When the value stored in the drawing processing control unit message reception register becomes "start", the process advances to step S702. The timing at which the value stored in the drawing processing control unit message reception register becomes "start" in step S701 corresponds to the message 504 shown in FIG. 5 in the drawing unit 211. In step S702, the drawing unit 211 writes "FALSE" in variable RipEnd. In step S703, the drawing unit 211 performs loop control so as to repeat the processing from step S704 to step S707 until "TRUE is written in variable RipEnd.

In step S704, the drawing unit 211 causes the instruction interpretation unit 301 to perform processing, that is, interpret intermediate data. If the result obtained by interpreting the instruction indicates that an instruction in the intermediate data is an instruction to draw the next scan line, the process advances to step S705. In step S705, the drawing unit 211 executes the processing ranging from operation by the contour write unit 302 to operation by the color composition unit 305 for one scan line of a page. If the result obtained by interpreting the instruction in step S704 indicates the end of drawing, the process advances to step S706. In step S706, the drawing unit 211 writes "completion of processing" in the drawing processing control unit message transmission register. Step S706 corresponds to the message 507 shown in FIG. 5. This causes the CPU 205 to detect that the drawing processing by the drawing unit 211 is complete. In step S707, the drawing unit 211 writes "TRUE" in variable RipEnd, and the process exits from the loop based on step S704. With this operation, the drawing unit 211 terminates this processing procedure.

<First Embodiment>

Figure 4B:
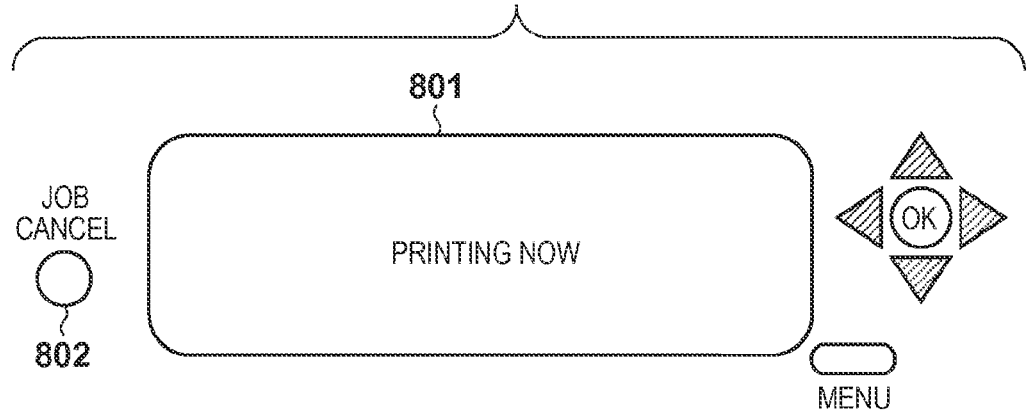

The first embodiment for carrying out the present invention will be described below with reference to the accompanying drawings. FIG. 4B shows the panel operation unit 104 of the printer 103 like FIG. 4A. Displaying "printing now" on a display unit 801 indicates that the print controller unit 105 is currently executing a print job. When the user presses a job cancel button 802 while "printing now" is displayed on the display unit 801 in this manner, the panel operation unit 104 transmits a job cancel instruction (stop instruction) to the job control unit 206 via the user I/F 203. Upon receiving the job cancel instruction, the job control unit 206 immediately executes a forcible stop for the currently executed print job.

FIG. 8 shows how processing is performed when the timing at which a forcible stop is enabled for a print job corresponds to normal drawing processing. Image data 901 indicates contone image data to be drawn by the drawing unit 211. The image data 901 has a page width W and a page height H, and has undergone drawing processing from the scan line indicated by y=1 and the scan line indicated by y=(H1−1). The drawing unit 211 is executing drawing processing for a scan line 902 indicated by y=H1. When the job control unit 206 applies a forcible stop to the drawing unit 211 while the drawing unit 211 is executing drawing processing for the scan line 902 indicated by y=H1, the drawing unit 211 executes drawing processing for the scan line indicated by y=H1 based on intermediate data. However, with regard to scan lines of H2 ranging from y=(H1+1) to y=H, the drawing unit 211 outputs (H2*W) pixel data having predetermined color values to the image processing H/W 212 regardless of the contents of intermediate data. Since the image processing H/W 212 cannot be stopped midway as described above, the drawing unit 211 outputs pixel data having the predetermined color values from the scan line next to the currently processed scan line to the image processing H/W 212 by the number of pixel data required to stop the image processing H/W 212. That is, the drawing unit 211 outputs the predetermined color values by the number equal to the number of unprocessed pixels with respect to the intermediate data. As these color values, values that allow clear determination that the corresponding pixels are unprocessed may be set. In this case, as color values, values which cannot be normally set as color values may be set.

[Image Processing Sequence]

Figure 9:
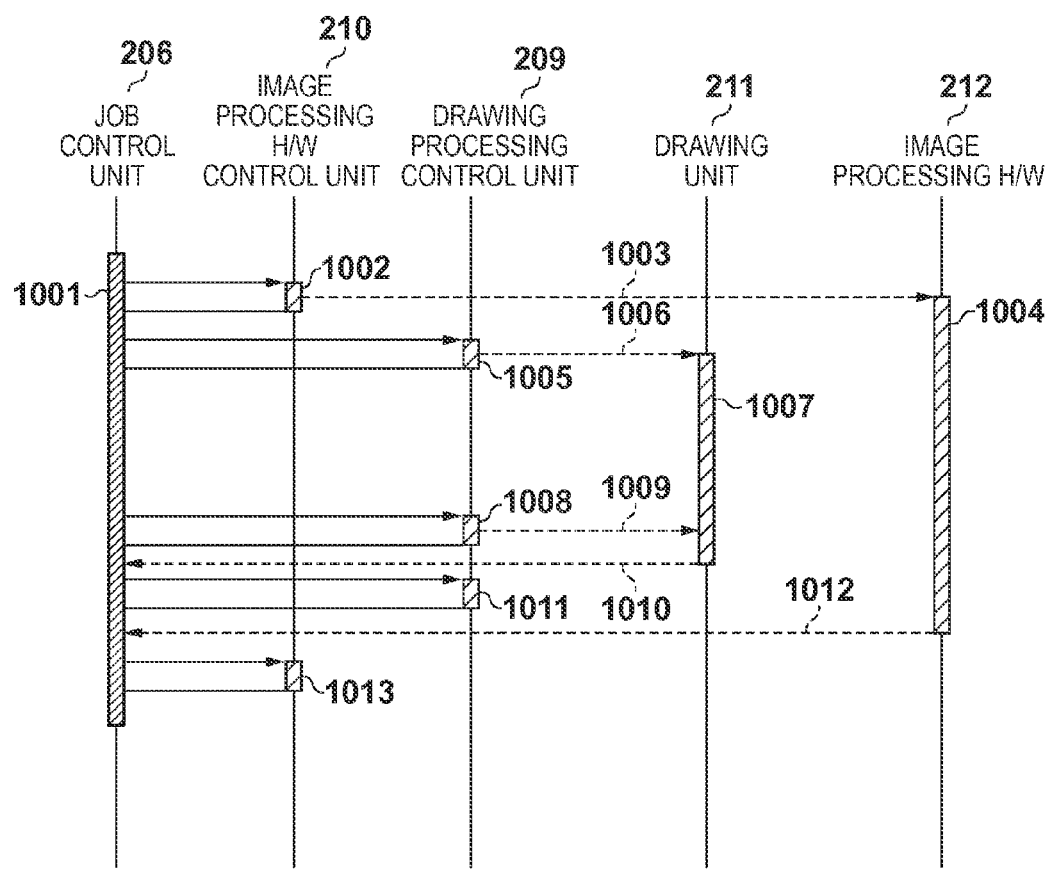
FIG. 9 is a sequence chart showing an outline of drawing processing from the start to the completion of a forcible stop according to the first embodiment.

FIG. 9 shows a sequence from the start to end of image processing by the image processing H/W 212 when the forcible stop processing is performed during execution of normal drawing processing by the drawing unit 211. The basic arrangement in FIG. 9 is the same as that in FIG. 5. More specifically, referring to FIGS. 5 and 9, a period 1001 is identical to the period 501, a message 1003 is identical to the message 502, a period 1004 is identical to the period 503, a message 1006 is identical to the message 504, a period 1007 is identical to the period 505, a message 1010 is identical to the message 507, and a message 1012 is identical to the message 508.

Assume that the CPU 205 always issues a forcible stop message to the drawing unit 211 in the interval between the drawing start message 1006 from the CPU 205 to the drawing unit 211 and the processing completion message 1010 from the drawing unit 211 to the CPU 205. Upon receiving the forcible stop message, the drawing unit 211 executes the processing described with reference to FIG. 8. Note that it is possible to issue a stop instruction when the user issues an instruction via the panel operation unit 104 or an error or the like occurs in the apparatus.

[Drawing Processing and Image Processing Procedures at Forcible Stop]

Figure 10C:
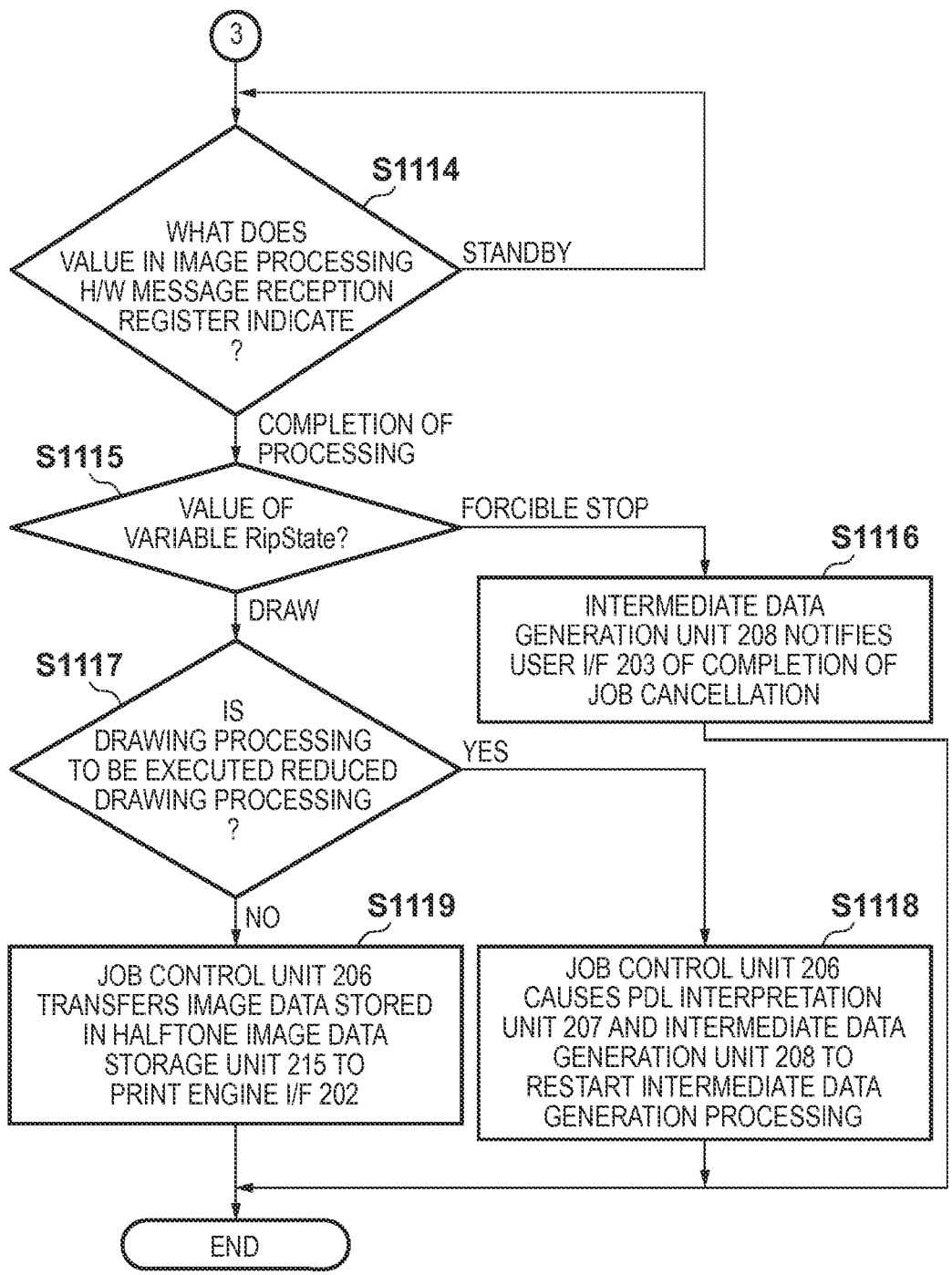

FIGS. 10A, 10B, and 10C are flowcharts showing the processing to be executed by the CPU 205, ranging from the start of drawing by the drawing unit 211 to the end of processing by the image processing H/W 212, when drawing processing executed by the drawing unit 211 is forcibly stopped in the first embodiment. Note that the broken line arrows in the flowcharts of FIGS. 10A, 10B, and 10C indicate correspondence with the processing shown in another drawing.

The processing from step S1101 to step S1107 is the same as that from step S601 to step S607 shown in FIG. 6A, and hence a description of the processing will be omitted. In step S1108, the drawing processing control unit 209 writes "draw" in variable RipState indicating the state of the drawing unit 211. Writing the state of the drawing unit 211 in variable RipState allows the CPU 205 to determine whether drawing processing is completed by the message "completion of processing" from the drawing unit 211 or a forcible stop is completed. In step S1109, the drawing processing control unit 209 writes "standby" in the drawing processing message reception register. In step S1110, the job control unit 206 receives a job cancel request from the user I/F 203.

In step S1111, the drawing processing control unit 209 writes "forcible stop" in variable RipState. In step S1112, the drawing processing control unit 209 writes "forcible stop" in the drawing processing message transmission register. Step S1112 corresponds to a message 1009 in FIG. 9, by which the drawing unit 211 can shift to the processing for a forcible stop. The processing in steps S1113 and S1114 is the same as that in steps S609 and S610 shown in FIG. 6B, and hence a description of the processing will be omitted.

In step S1115, the job control unit 206 refers to the value of drawing processing variable RipState. If the value of variable RipState indicates "forcible state", the process advances to step S1116. In step S1116, the job control unit 206 notifies the user I/F 203 of the completion of the job cancellation. In step S1115, if the value of variable RipState indicates "draw", the job control unit 206 performs the processing from step S1117 to step S1119. The processing from step S1117 to step S1119 is the same as that from step S611 to step S613 shown in FIG. 6B, and hence a description of the processing will be omitted.

[Drawing Processing Procedure at Forcible Stop]

FIGS. 11A and 11B are flowcharts showing the processing to be executed by the drawing unit 211 when the drawing processing executed by the drawing unit 211 is forcibly stopped in the first embodiment. Note that the broken line arrows in the flowcharts of FIGS. 11A and 11B indicate correspondence with the processing shown in another drawing.

The processing from step S1201 to step S1203 is the same as that from step S701 to step S703 shown in FIG. 7, and hence a description of the processing will be omitted. In step S1204, the drawing unit 211 checks the value stored in the drawing processing control unit message reception register. If the check result indicates that the stored value indicates "start", the drawing unit 211 performs the processing from step S1205 to step S1208. Since the processing from step S1205 to step S1208 is the same as that from step S705 to step S708 shown in FIG. 7, a description of the processing will be omitted. If the value stored in the drawing processing control unit message reception register indicates "forcible stop", the process advances to step S1209.

In step S1209, the drawing unit 211 refers to the output destination information storage unit 217. If the output destination stored in the output destination information storage unit 217 is the contone image data storage unit 214, since the image processing H/W 212 is not ready for executing image processing, the process advances to step S1207. That is, the drawing unit 211 regards that the image processing H/W 212 can be stopped. If the output destination stored in the output destination information storage unit 217 is the image processing H/W 212, the drawing unit 211 performs the processing from step S1210 to step S1212. That is, if the output destination stored in the output destination information storage unit 217 is the image processing H/W 212, the drawing unit 211 regards that the image processing H/W 212 cannot be stopped.

In step S1210, the drawing unit 211 calculates a total count PixNum of pixels which have not been generated at the current time. The drawing unit 211 uses a calculation method of obtaining this total count by acquiring a height H of a page and a scan line width W of the page from intermediate data and using equation (1) based on a scan line count H1 stored in the drawn scan line count storage unit 219:

$$\text{PixNum} = W*(H-H1) \quad (1)$$

In step S1211, the drawing unit 211 performs loop control so as to execute step S1212 by PixNum. In step S1212, the drawing unit 211 outputs pixels having predetermined color values to the image processing H/W 212.

With the above operation, in the arrangement in which the drawing processing module is connected in series with the image processing module, even while the drawing processing module and the image processing module are executing processing in print processing, the apparatus can forcibly stop the modules in response to a job cancel request from the user. This makes it possible to forcibly stop processing at an early stage in response to a job cancel request from the user. This can therefore improve the convenience to the user.

<Second Embodiment>

Figure 4C:
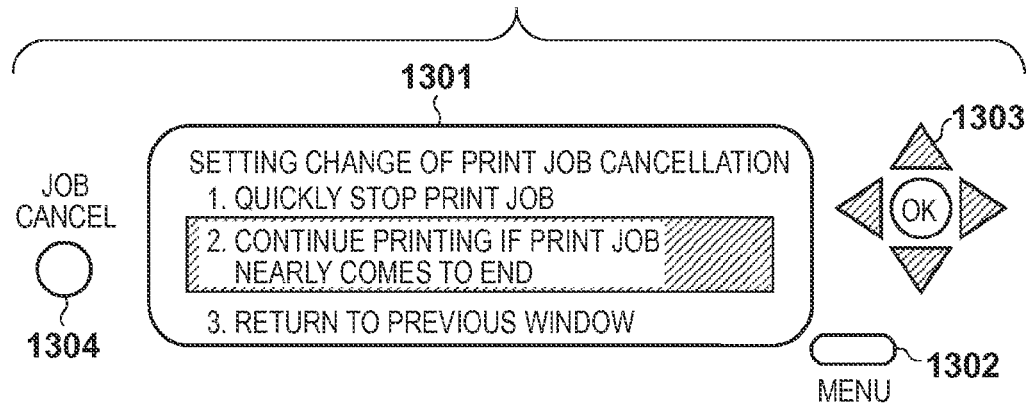

The second embodiment for carrying out the present invention will be described below with reference to the accompanying drawings. Like FIGS. 4A and 4B, FIG. 4C shows a panel operation unit 104 of a printer 103. When the user presses a menu button 1302, a menu for setting changes in the printer 103 is displayed. The user sets a desired setting by operating a selection button 1303. A display unit 1301 displays an example of a menu window for setting change of print job cancellation. The user can select a job cancel method when he/she presses a job cancel button 1304 during execution of a print job in the printer 103 to execute job cancellation.

When the user selects "1. quickly stop print job" of the selection items displayed in the menu window, a drawing unit 211 enables a forcible stop by the method described in the first embodiment. When the user selects "2. continue printing if print job nearly comes to end", if the drawing processing is nearly completed at the timing at which the user has executed job cancellation, the drawing unit 211 completes the drawing processing and performs sheet delivery processing. This makes it possible to output print data so as to complete drawing processing and perform sheet delivery processing within a short period of time unless the user executes job cancellation with resignation. This can reduce the opportunity loss of print output by the user due to job cancellation. In this case, "job nearly comes to end" indicates that the processing of the job is completed under the condition defined in advance. The details of the condition will be described below.

Figure 12:
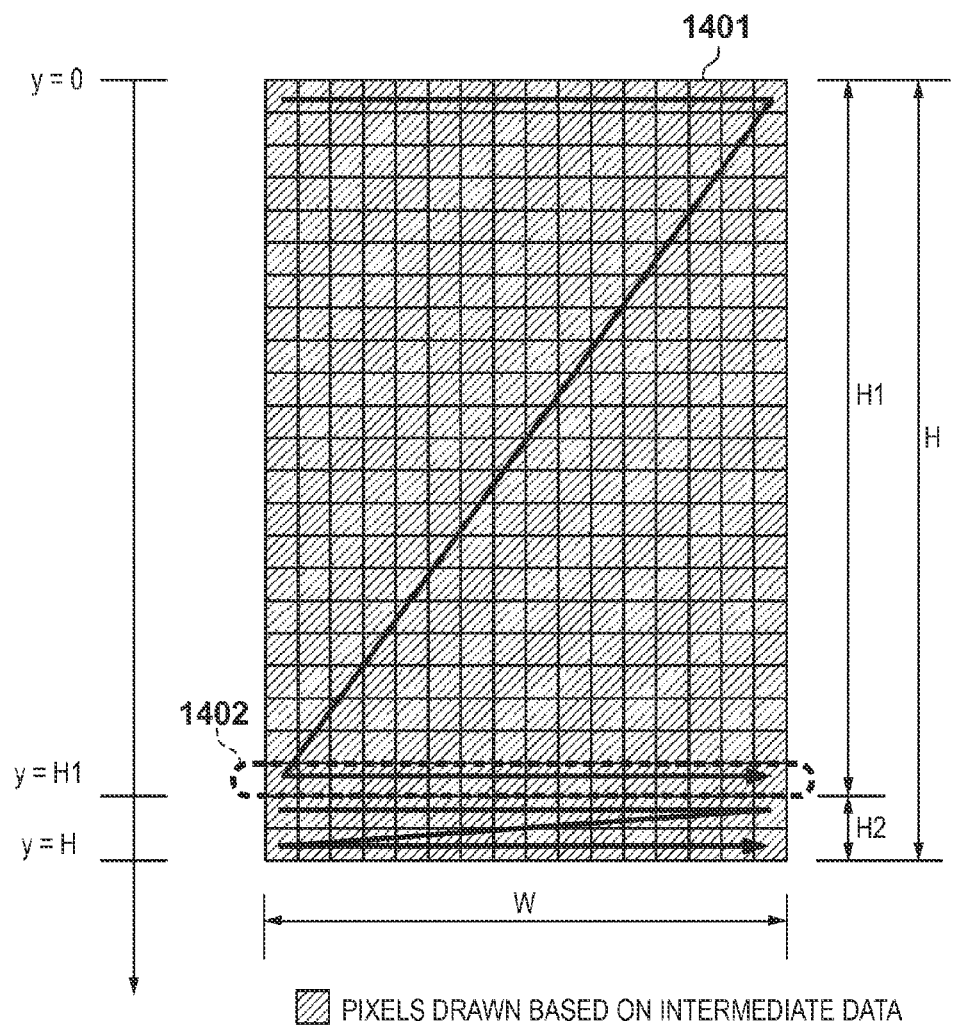
FIG. 12 is a view showing an outline of processing according to the second embodiment.

FIG. 12 is a view for explaining a specific case in which a print job is executed without being forcibly stopped. Image data 1401 indicates contone image data to be drawn by the drawing unit 211. The image data 1401 has a page width W and a page height H, and has undergone drawing processing from the scan line indicated by y=1 to the scan line indicated by y=(H1-1). The drawing unit 211 is executing drawing processing for a scan line 1402 indicated by y=H1. A job control unit 206 receives a job cancel request from the user while the drawing unit 211 is performing drawing processing for the scan line 1402 indicated by y=H1. A drawing processing control unit 209 then performs check processing for the state of process of the drawing processing by the drawing unit 211 and an average drawing processing time per scan line.

The drawing processing control unit 209 determines, based on the above two points, whether to transmit a forcible stop instruction to the drawing unit 211. The drawing processing control unit 209 determines the state of process of the drawing processing depending on whether the page height H, a drawn scan line count H1, and predetermined threshold Th1 satisfy the following condition:

$$(H1/H) > Th1 \quad (2)$$

If the above values do not satisfy inequality (2), the drawing processing control unit 209 transmits a forcible stop instruction to the drawing unit 211. Note that the value of the threshold Th1 may be a fixed value for each apparatus or may be set by the manager of the image forming apparatus.

An average drawing time per scan line is obtained by the following procedure. First of all, the drawing processing control unit 209 acquires time t1 inside the printer 103 from a system control unit 216 immediately before transmitting a drawing start message to the drawing unit 211. In addition, the drawing processing control unit 209 acquires time t2 immediately after the job control unit has received the job cancel request from a user I/F 203. It is possible to determine an average drawing time depending on whether t1, t2, a drawn scan line count (H1-1), and a predetermined threshold Th2 satisfy the following condition:

$$(t2-t1)/H1 < Th2 \quad (3)$$

If the above values do not satisfy inequality (3), the drawing processing control unit 209 transmits a forcible stop instruction to the drawing unit 211. Only when both the above two inequalities (inequalities (2) and (3)) are satisfied, the drawing processing control unit 209 makes the drawing unit 211 continue the drawing processing based on the intermediate data without forcibly stopping it. Note that the value of the threshold Th2 may be a fixed value for each apparatus or may be set by the manager of the image forming apparatus.

[Drawing Processing and Image Processing Procedures at Forcible Stop]

Figure 13A:
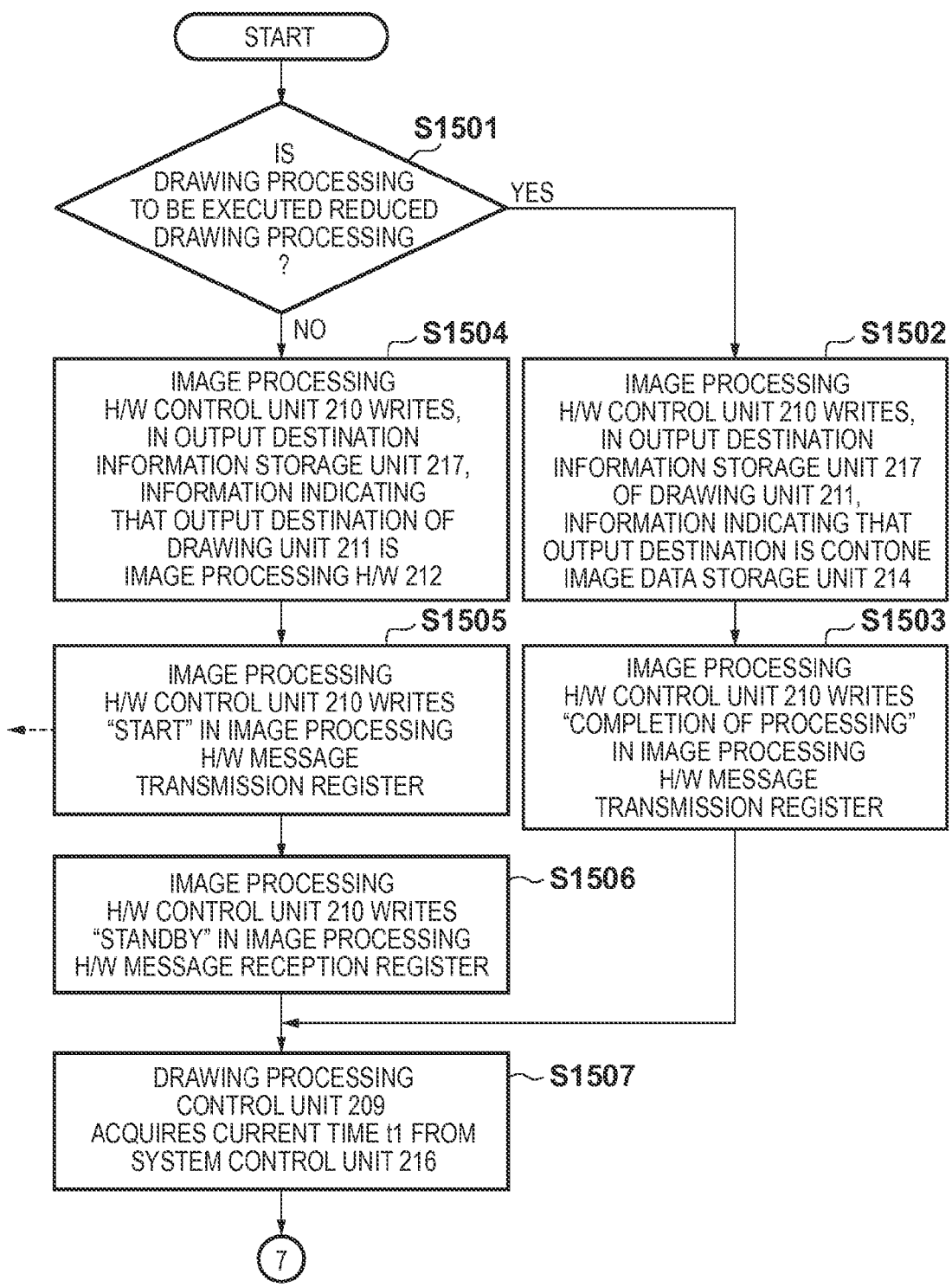
Figure 13C:
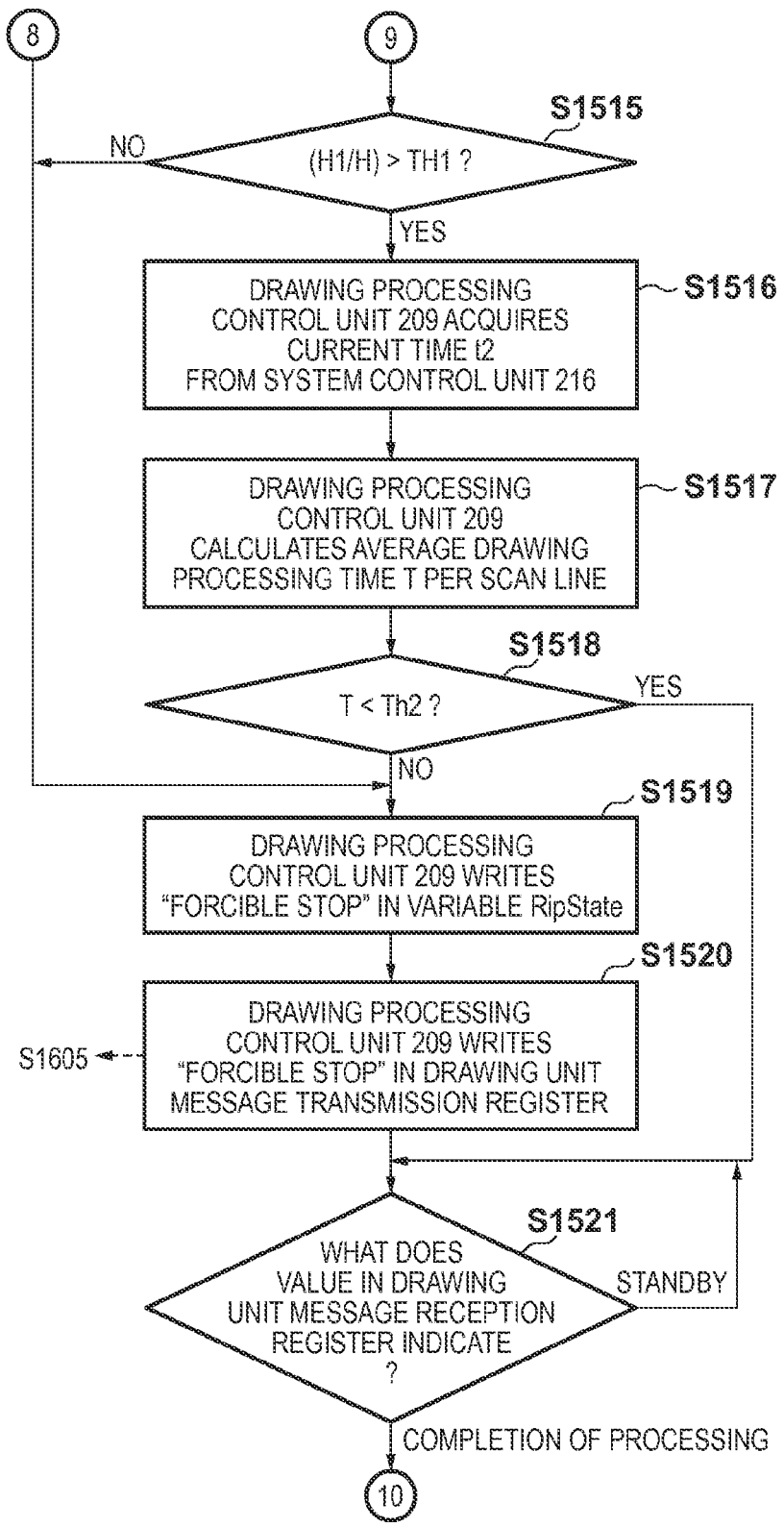
Figure 13D:
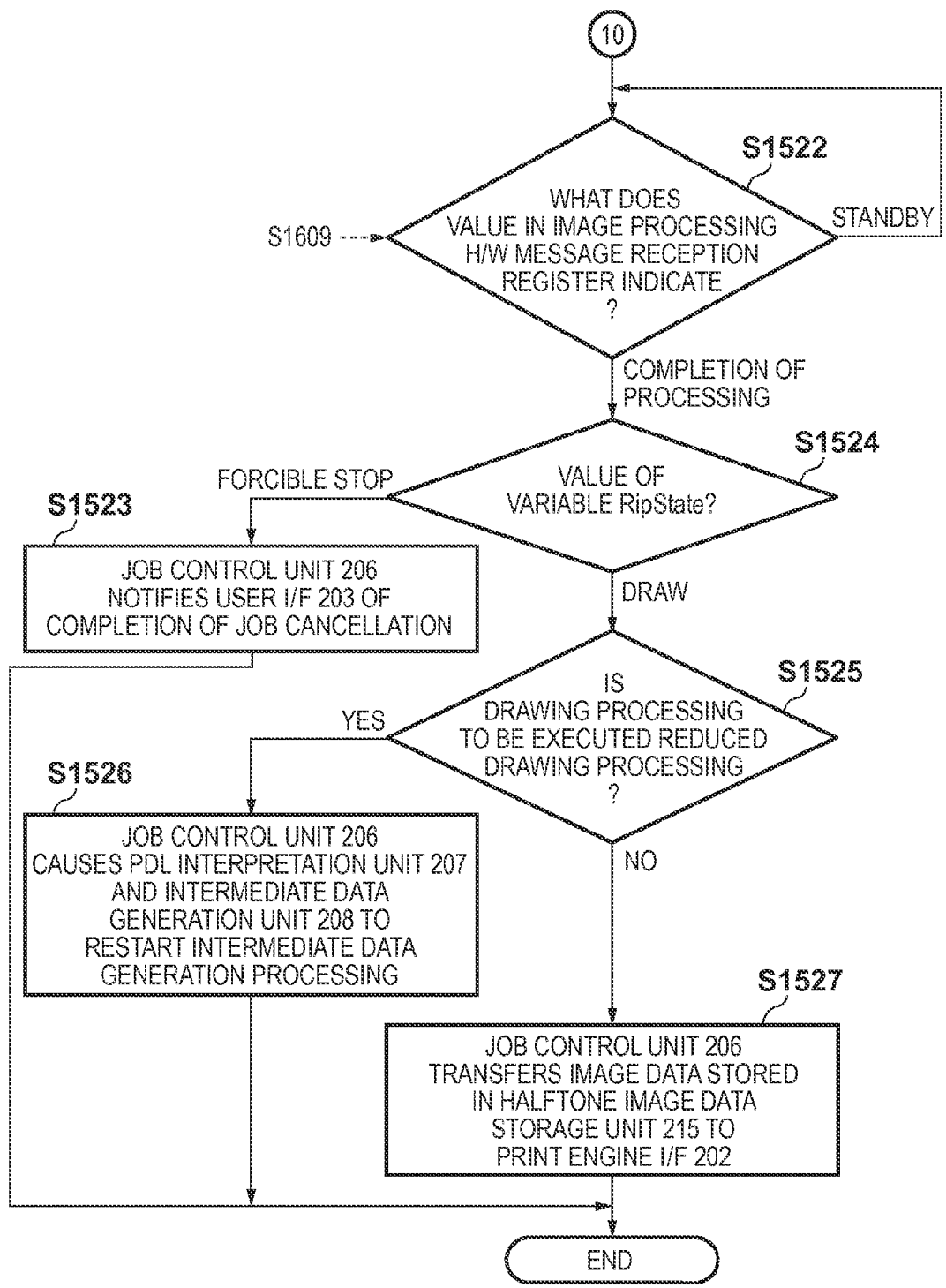

FIGS. 13A and 13B are flowcharts of processing executed by a CPU 205, ranging from the start of drawing by the drawing unit 211 and the end of processing by the image processing H/W 212 in the second embodiment. Note, however, that these flowcharts are those for the case in which the user sets "continue printing if print job nearly comes to end" with the panel operation unit 104, and the job control unit 206 receives a job cancel request during the execution of drawing processing. Note that the broken line arrows in the flowcharts of FIGS. 13A and 13B indicate correspondence with the processing shown in another drawing.

The processing from step S1501 to step S1506 is the same as that from step S1101 to step S1106 shown in FIG. 10A, and hence a description of the processing will be omitted. In step S1507, the drawing processing control unit 209 acquires current time t1 from the system control unit 216. The processing from step S1508 to step S1511 is the same as that from step S1107 to step S1110 shown in FIGS. 10A and 10B, and hence a description of the processing will be omitted. In step S1512, the job control unit 206 refers to a forcible stop avoidance information storage unit 218. If the value stored in the forcible stop avoidance information storage unit 218 indicates "OFF", the process advances to step S1519. If the value stored in the forcible stop avoidance information storage unit 218 indicates "ON", the process advances to step S1513.

In step S1513, the drawing processing control unit 209 acquires the drawn scan line count H1 from the drawn scan line count storage unit 219. In step S1514, the drawing processing control unit 209 acquires the page height H from the intermediate data. In step S1515, the drawing processing control unit 209 compares (H1/H) with a predetermined threshold Th1. If the value of (H1/H) is equal to or less than Th1 (NO in step S1515), the process advances to step S1519. If the value of (H1/H) is larger than Th1 (YES in step S1515), the process advances to step S1516.

In step S1516, the drawing processing control unit 209 acquires current time t2 from the system control unit 216. In step S1517, the drawing processing control unit 209 calculates an average drawing time T per scan line by using equation (4):

$$T = ((t2-t1)/H1) \quad (4)$$

In step S1518, the drawing processing control unit 209 compares the average drawing time T obtained in step S1517 with a predetermined threshold Th2. If T is smaller than Th2 (YES in step S1518), the process advances to step S1521. If T is equal to or more than Th2 (NO in step S1518), the process advances to step S1519. That is, steps S1515 and S1518 in which the drawing processing control unit 209 performs determination based on inequality (3) and equality (4) implement the first determination unit. The processing from step S1519 to step S1527 is the same as that from step S1111 to step S1119 shown in FIGS. 10B and 10C, and hence a description of the processing will be omitted.

[Drawing Processing Procedure at Forcible Stop]

Figure 14B:
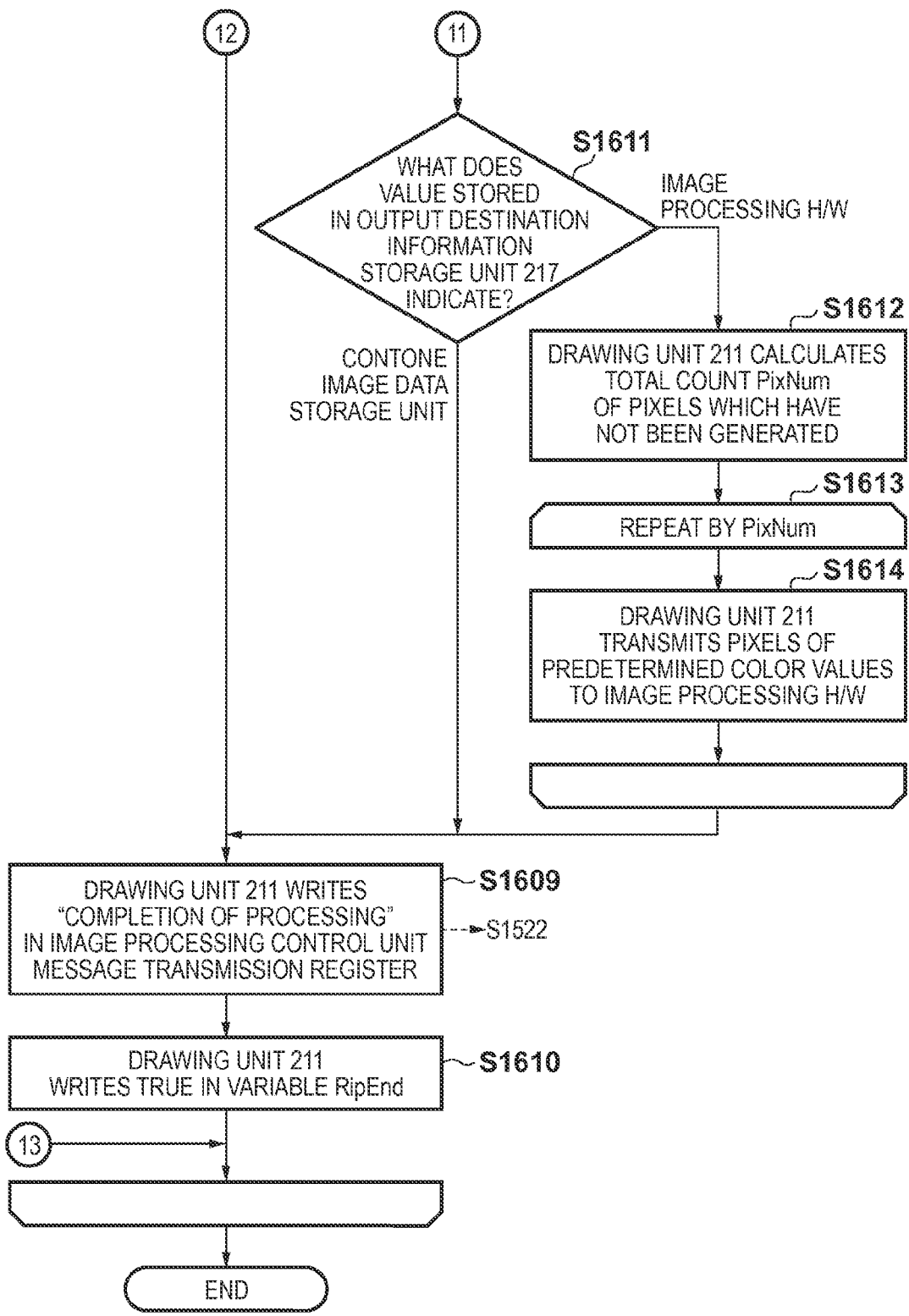

FIGS. 14A and 14B are flowcharts of the processing executed by the drawing unit 211, ranging from the start to end of drawing by the drawing unit 211, in the second embodiment. Note that the broken line arrows in the flowcharts of FIGS. 14A and 14B indicate correspondence with the processing shown in another drawing.

The processing in steps S1601 and S1602 is the same as that in steps S1201 and S1202 shown in FIG. 11A, and hence a description of the processing will be omitted. In step S1603, the drawing unit 211 writes "0" in the drawn scan line count storage unit 219. The processing from step S1604 to step S1607 is the same as that from step S1203 to step S1206 shown in FIG. 11A, and hence a description of the processing will be omitted.

In step S1608, the drawing unit 211 adds +1 to the value stored in the drawn scan line counter. The processing from step S1609 to step S1614 is the same as that from step S1207 to step S1212 shown in FIG. 11B, and hence a description of the processing will be omitted. Note that step S1611 implements the second determination unit.

With the above processing, in addition to the effect of the first embodiment, the second embodiment allows the user to select to continue processing without stopping it if the processing nearly comes to end, thereby further improving the convenience to the user.

<Third Embodiment>

When a printer 103 shifts to the power saving mode based on the determination made by a system control unit 216, the supply of power to all the H/W units except for a CPU 205 and some memories is shut off in the printer 103 until it returns from the power saving mode. If the system control unit 216 shifts to the power saving mode during drawing processing by a drawing unit 211 accompanying this operation, a forcible stop is executed on the drawing unit 211. After returning from the power saving mode, the drawing unit 211 redoes the drawing processing which it has executed immediately before the execution of the forcible stop from the beginning. For this reason, if the printer 103 shifts to the power saving mode while the user is executing a print job on the printer 103, it is necessary to redo the drawing processing from the beginning after the printer 103 returns from the power saving mode. The user therefore needs to take extra time. With regard to a forcible stop of drawing processing, this embodiment will describe a method of continuing the drawing processing from the state immediately before the interruption of the processing in a case in which after the drawing processing is temporarily interrupted in the power saving mode or the like, the drawing processing is to be restarted by using the same intermediate data as that used before the interruption. The third embodiment for carrying out the present invention will be described below with reference to the accompanying drawings.

Figure 15A:
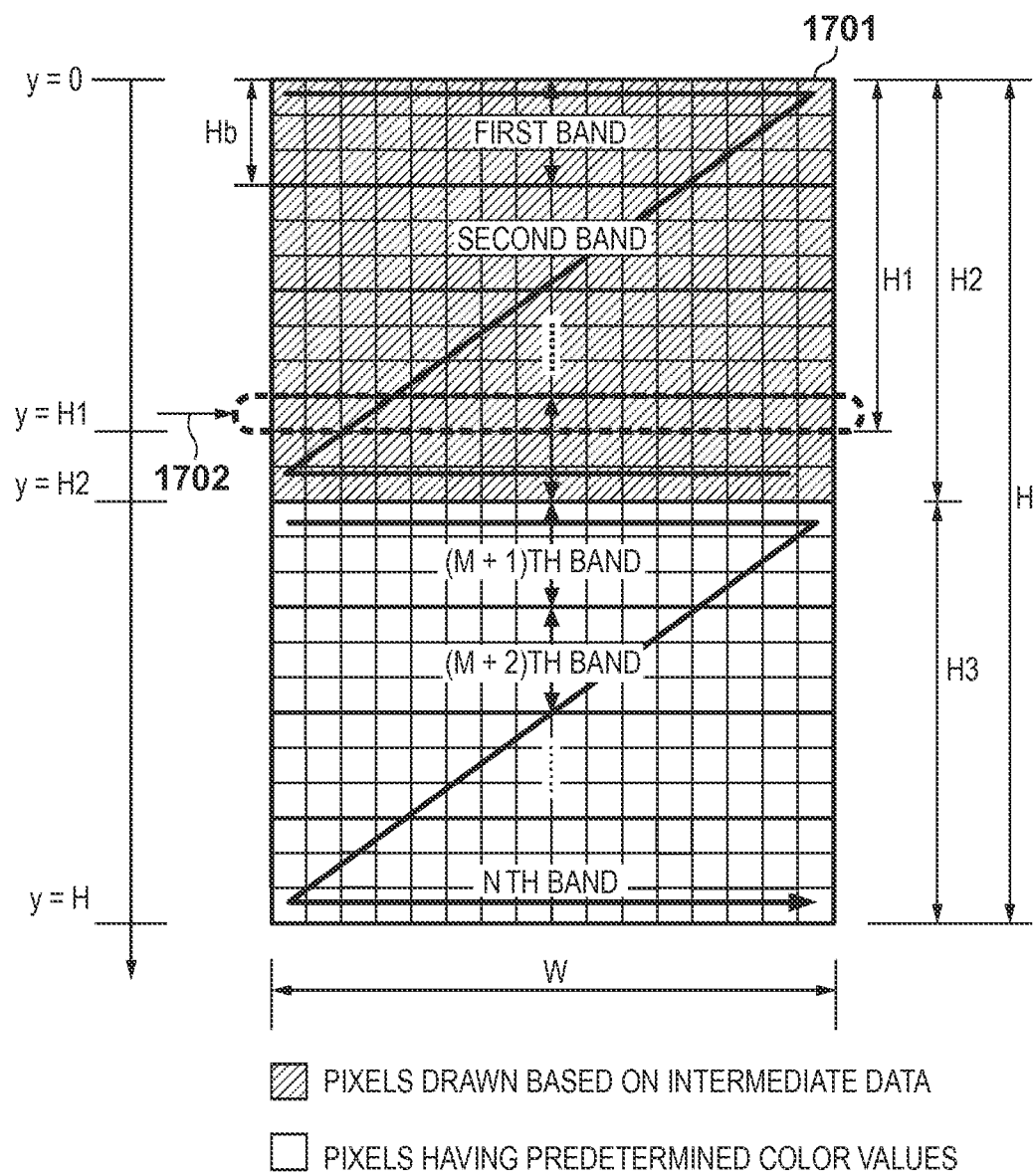
FIGS. 15A and 15B are views showing an outline of processing according to the third embodiment.
Figure 15B:
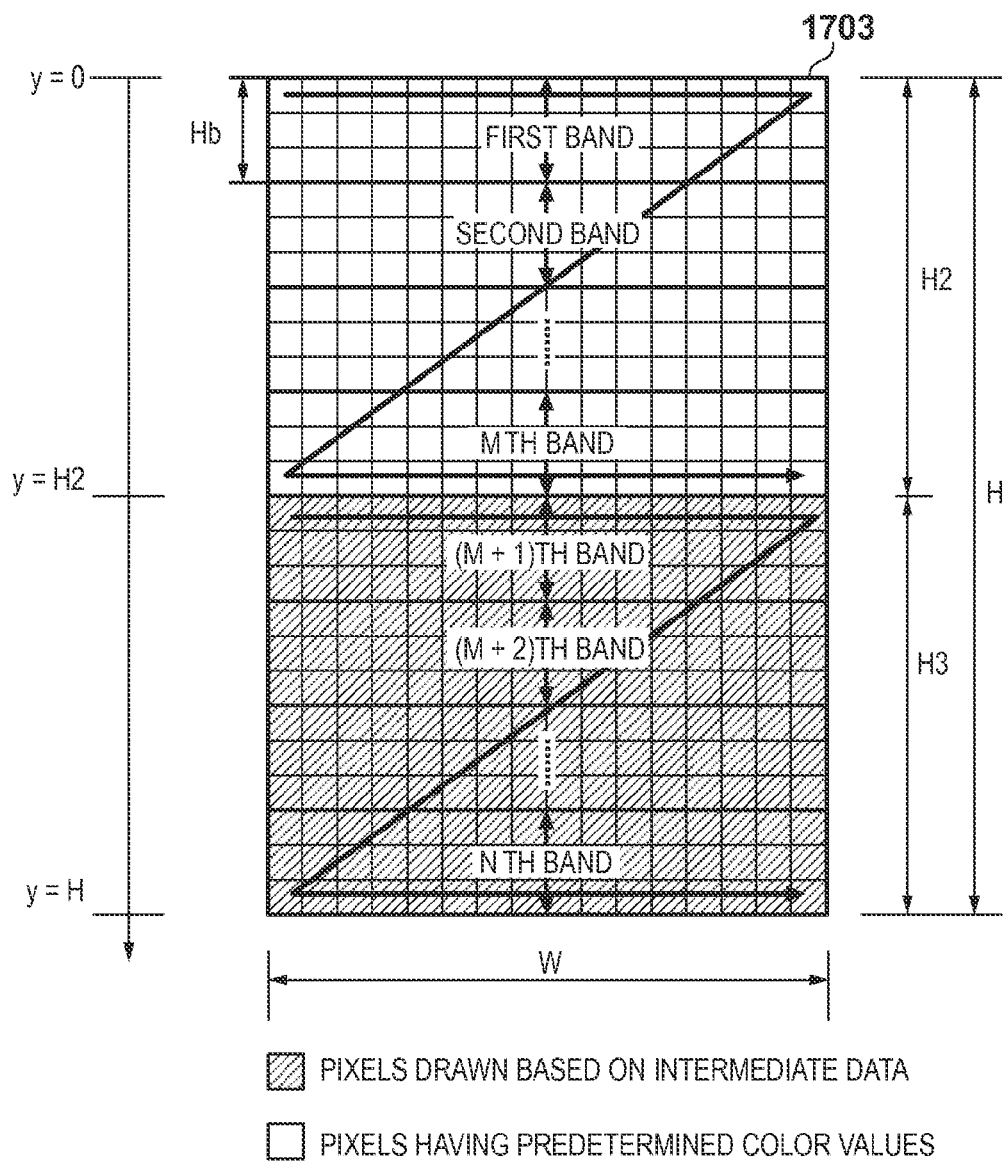
Figure 16A:
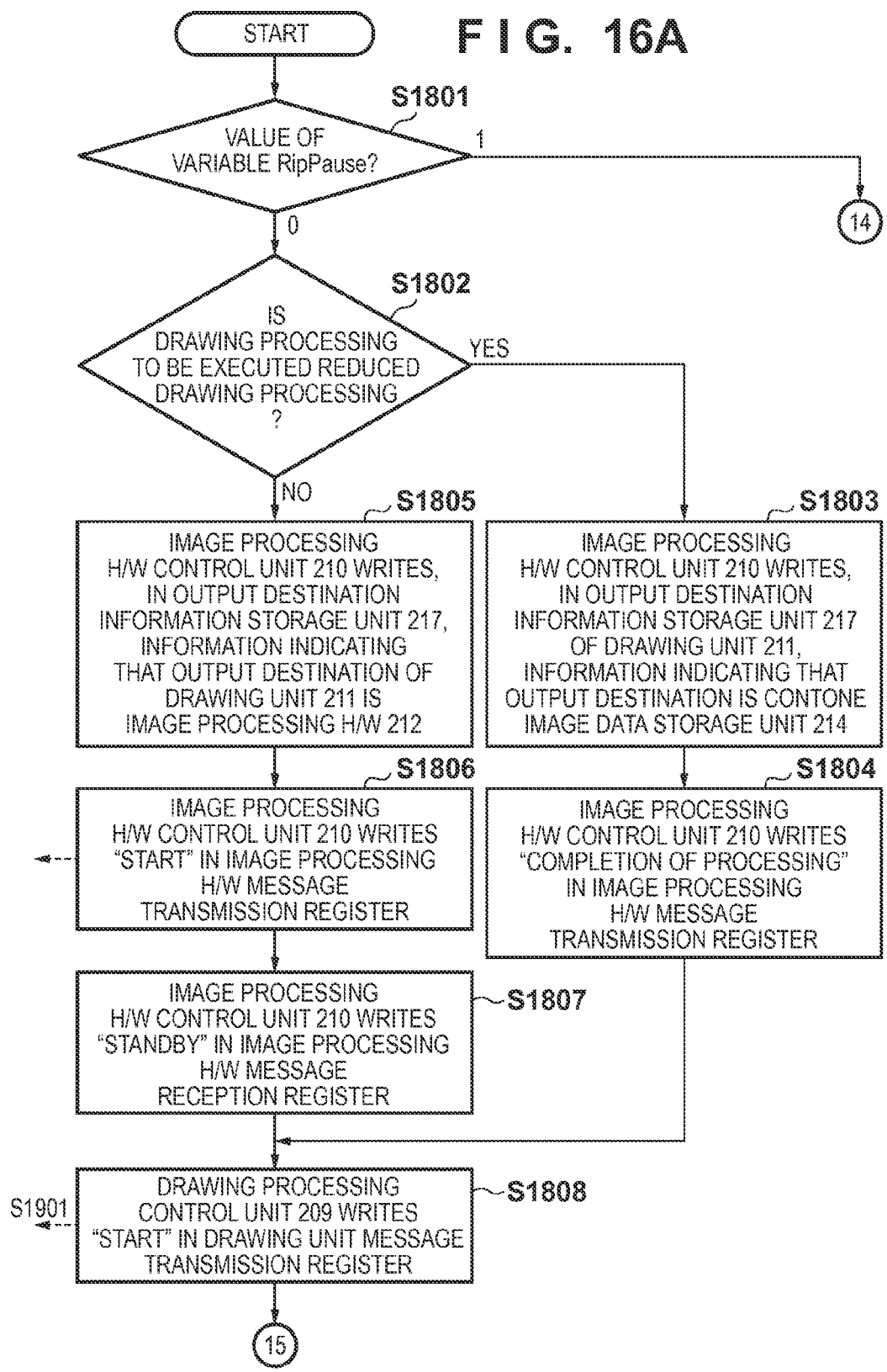
Figure 16B:
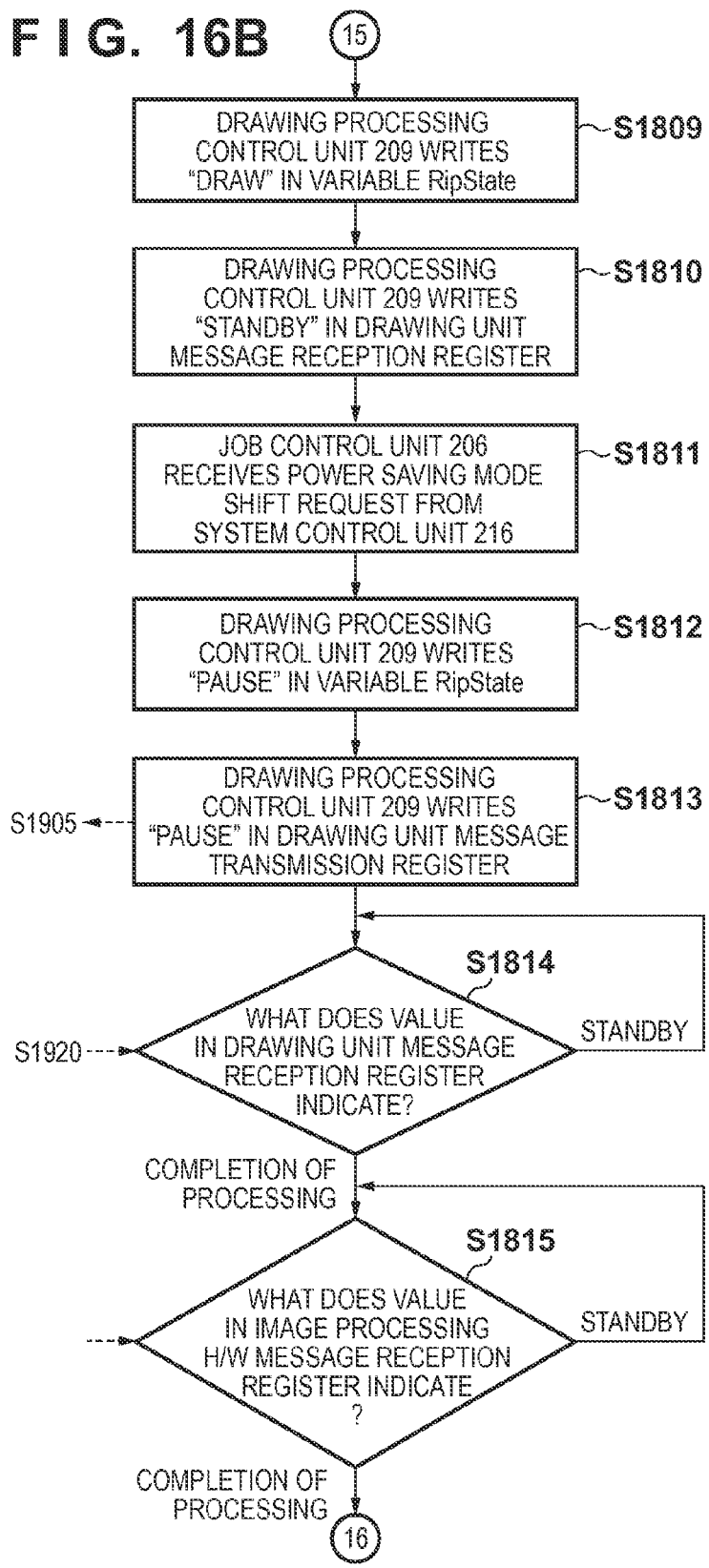
Figure 16D:
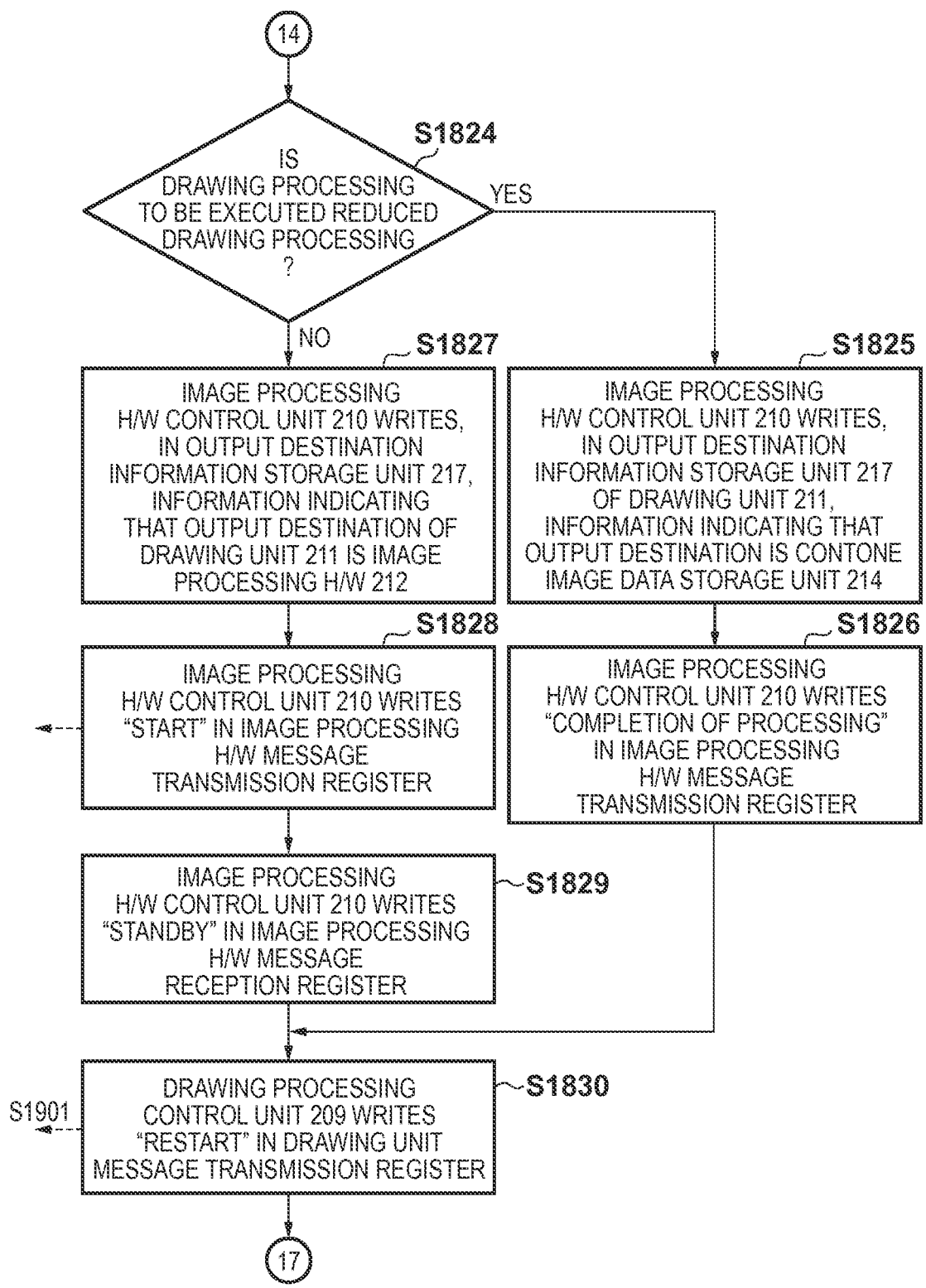
Figure 16E:
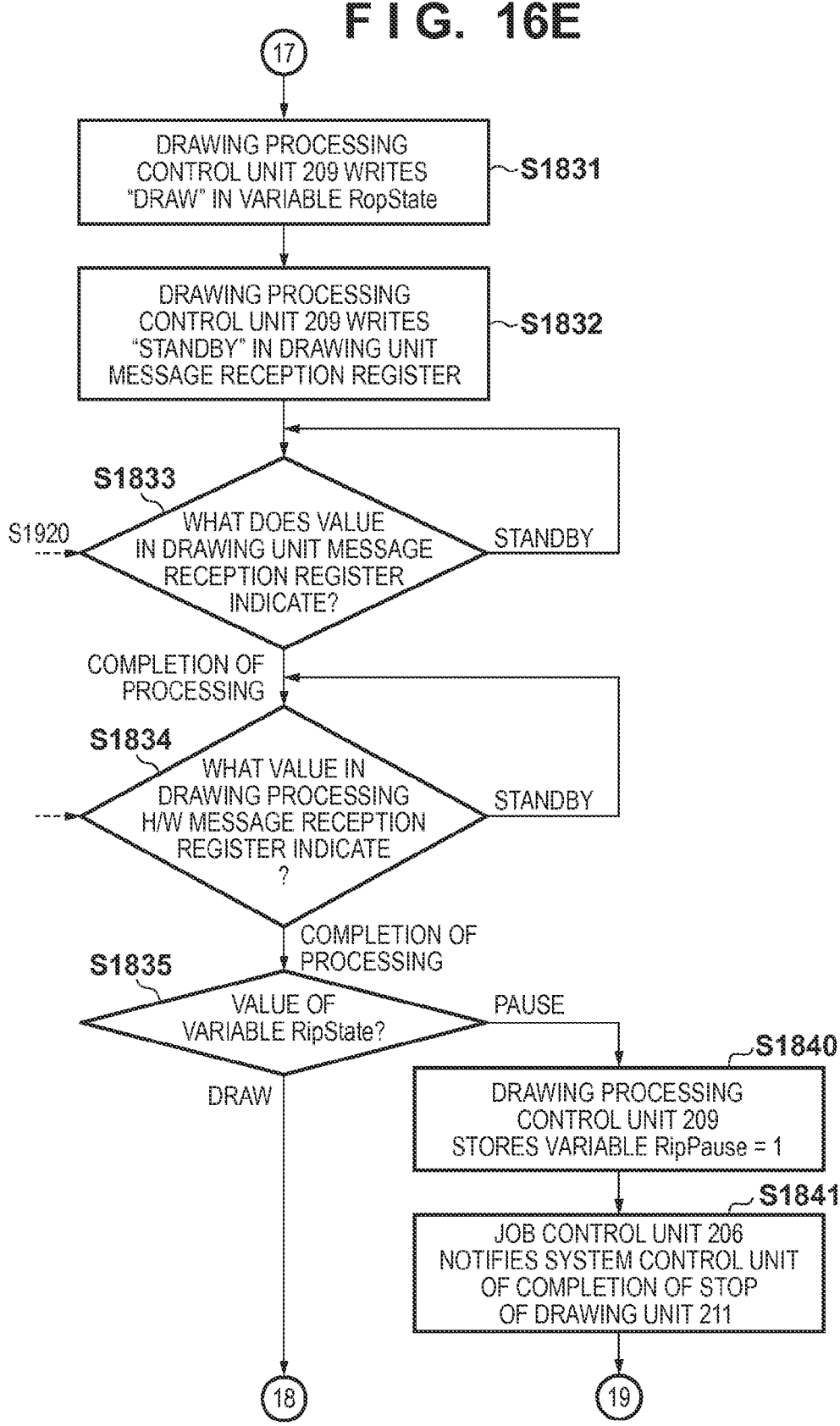
Figure 17A:
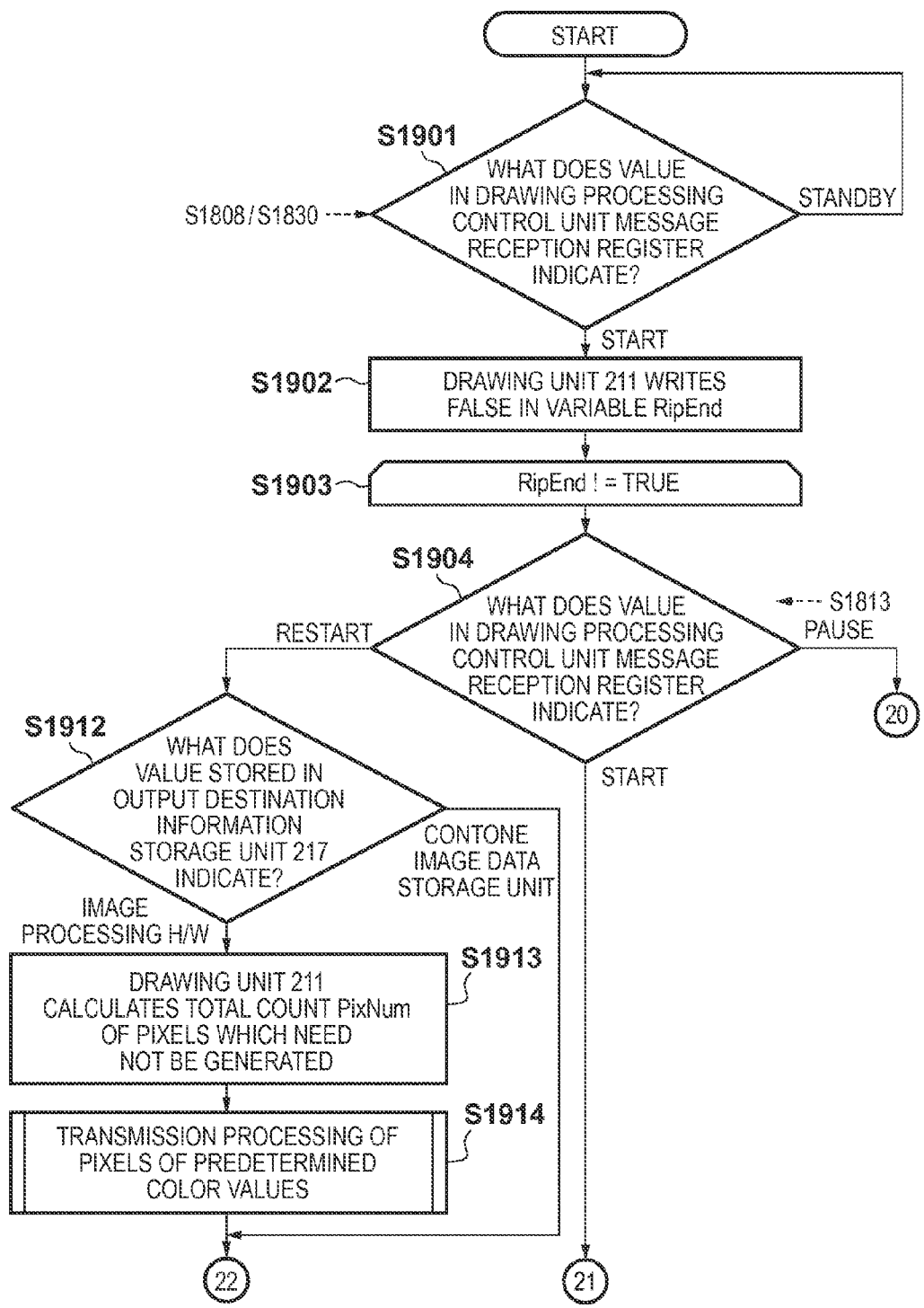
FIGS. 17A, 17B, 17C, and 17D are flowcharts showing drawing processing according to the third embodiment.
Figure 17B:
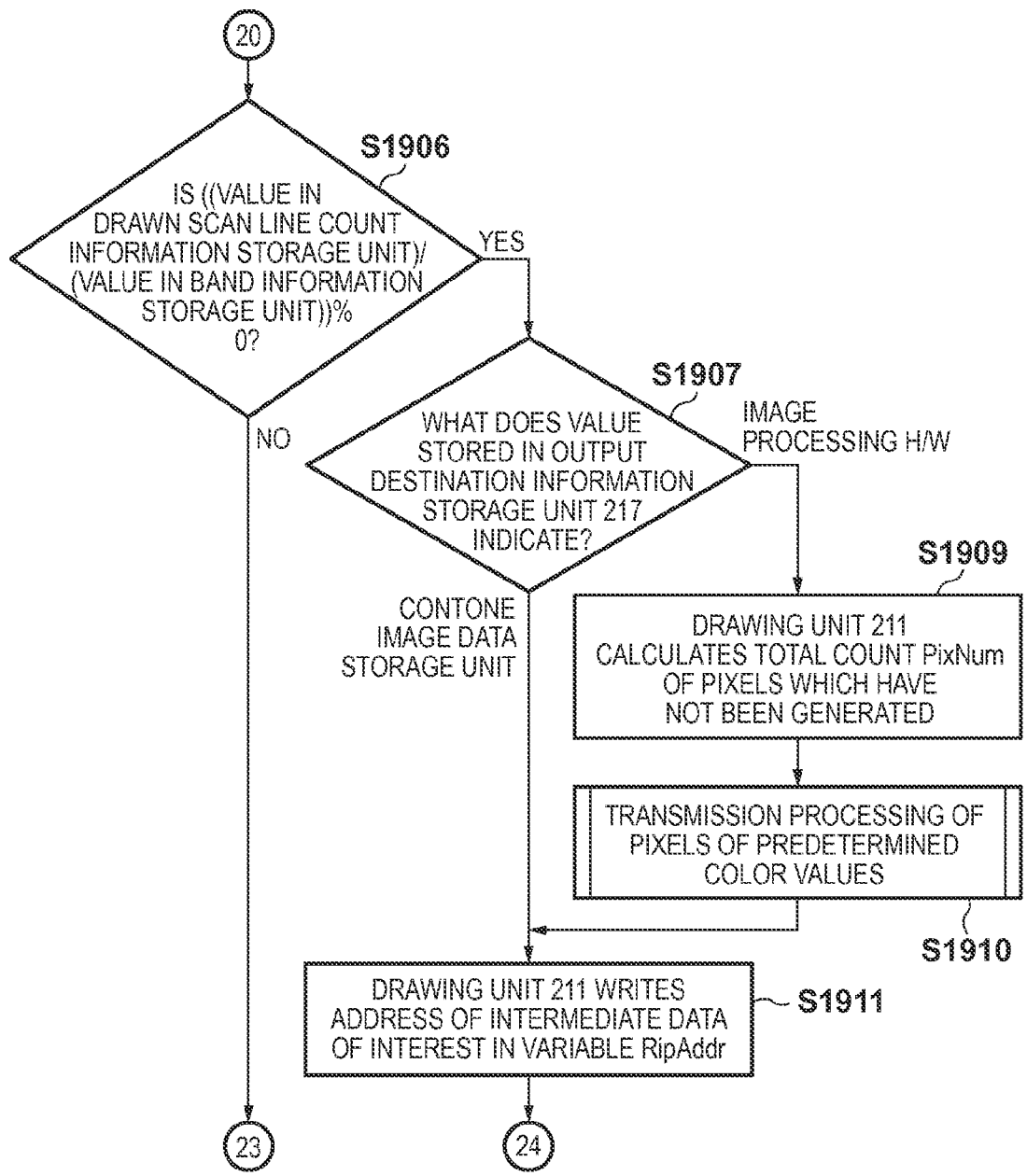
Figure 17C:
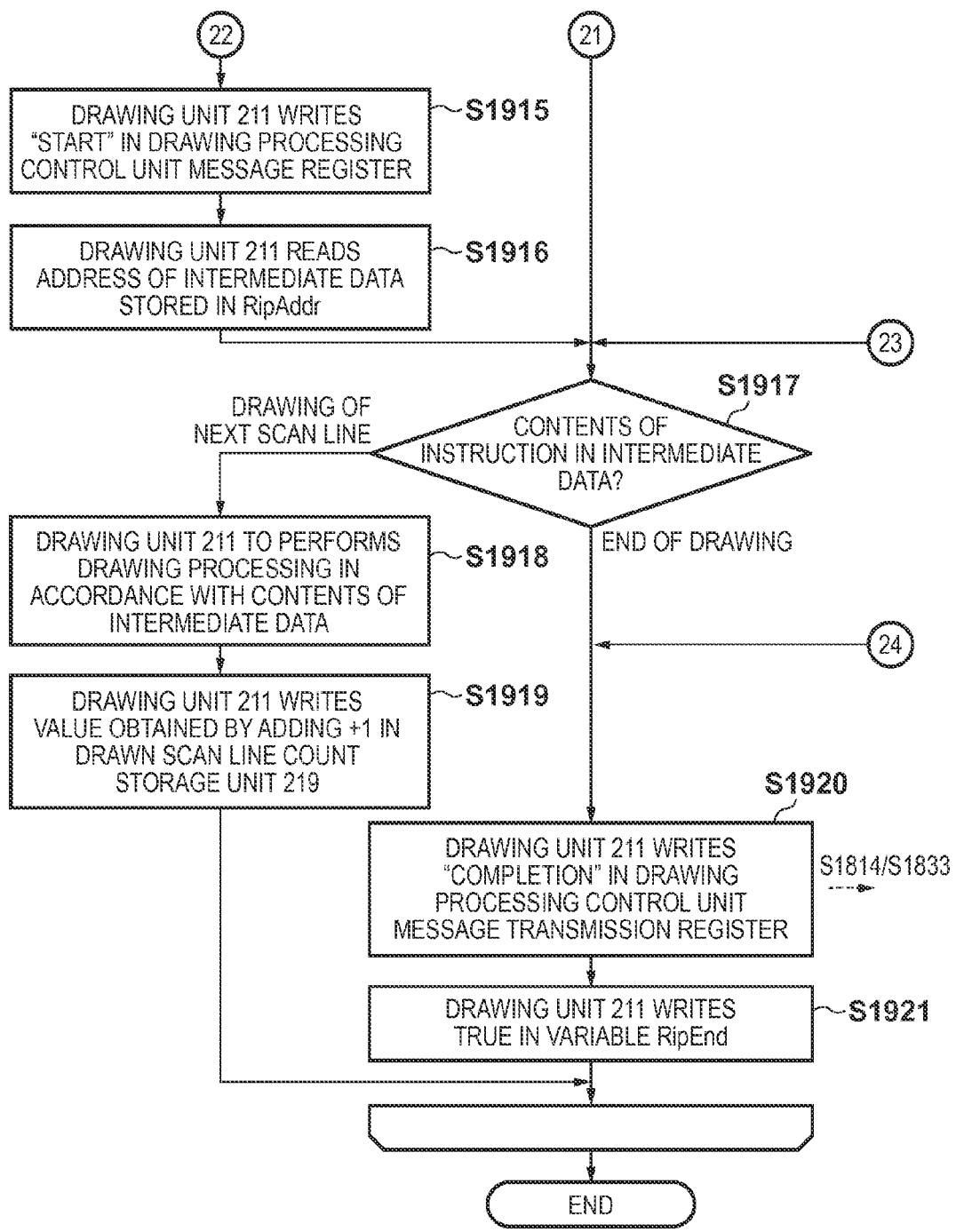
Figure 17D:
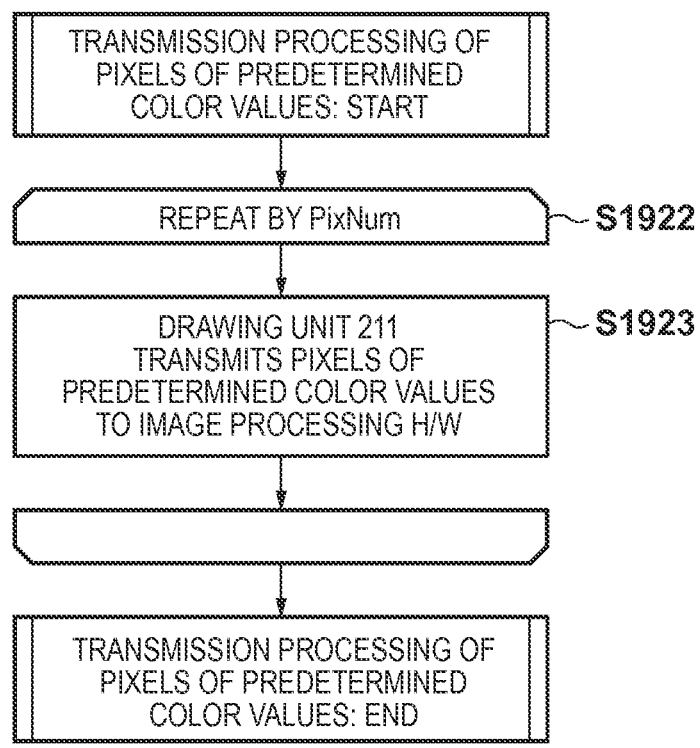

FIGS. 15A and 15B are views showing a state in which the drawing unit 211 enters the power saving mode during drawing processing and a state of normal drawing processing after return from the power saving mode. In this case, when the drawing unit 211 switches to the power saving mode, a pause instruction is issued.

Referring to FIG. 15A, image data 1701 has a page height (total scan line count) H, a page width (scan line width) W, and a band height Hb. A scan line 1702 is a scan line currently processed by the drawing unit 211. When the drawing unit 211 receives "pause" to enter the power saving mode while it is processing the scan line 1702, the drawing unit 211 performs drawing processing up to a band boundary based on intermediate data. That is, the drawing unit 211 performs drawing processing up to the Mth band (y=H2) including the scan line 1702 as a band of interest based on the intermediate data. The drawing unit 211 then outputs pixels of predetermined color values from the (M+1)th band to image processing H/W 212. That is, the drawing unit 211 outputs predetermined color values by the number of pixels included in the intermediate data after the (M+1)th band.

After the drawing unit 211 returns from the power saving mode, it outputs pixels of predetermined color values in the interval from the first band to the Mth band to the image processing H/W 212, like image data 1703 shown in FIG. 15B. The drawing unit 211 then performs drawing processing based on the intermediate data from the (M+1)th band (y=H2+1). Performing drawing processing in this manner can avoid processing the same pixel twice or more in the drawing processing based on intermediate data in a case in which the drawing unit 211 shifts to the power saving mode during drawing processing and returns from the power saving mode. It can therefore be expected to improve the efficiency of drawing processing when the drawing unit 211 shifts to the power saving mode during drawing processing and returns from the power saving mode.

[Drawing Processing and Image Processing Procedures at Pause]

FIGS. 16A, 16B, 16C, 16D, 16E, and 16F are flowcharts of processing executed by the CPU 205 until the drawing processing control unit 209 and an image processing H/W control unit 210 detect the end of processing by the image processing H/W 212. Note that the broken line arrows in the flowcharts of FIGS. 16A, 16B, 16C, 16D, 16E, and 16F indicate correspondence with the processing shown in another drawing.

In step S1801, a job control unit 206 refers to the value of variable RipPause. Assume that "0" is stored as the initial value of variable RipPause. If the value of RipPause is "1", the job control unit 206 determines that it executes the rest of the drawing processing which has been executed immediately before it has entered the power saving mode. The process then advances to step S1825. If the value of RipPause is "0", the job control unit 206 determines there is no drawing processing to be continued. The process then advances to step S1802. The processing from step S1802 to step S1810 is the same as that from step S1101 to step S1109 shown in FIGS. 10A and 10B, and hence a description of the processing will be omitted.

In step S1811, the job control unit 206 receives a power saving mode shift request from the system control unit 216. In step S1812, a drawing processing control unit 209 writes "pause" in variable RipState. In step S1813, the drawing processing control unit 209 writes "pause" in the drawing unit message transmission register. The processing in steps S1814 and S1815 is the same as that in steps S1113 and S1114 shown in FIGS. 10B and 10C, and hence a description of the processing will be omitted.

In step S1816, the job control unit 206 refers to the values of variable RipState. If the value of RipState indicates "pause", the process advances to step S1822. If the value of RipState indicates "draw", the process advances to step S1818. The processing from step S1818 to step S1820 is the same as that from step S1117 to step S1119 shown in FIG. 10C, and hence a description of the processing will be omitted. After the processing in step S1819 or S1820, the process advances to step S1821. In step S1821, the drawing processing control unit 209 writes "0" in variable RipPause. The drawing processing control unit 209 then terminates this processing procedure.

In step S1822, the drawing processing control unit 209 writes "1" in variable RipPause. In step S1823, the job control unit 206 notifies the system control unit 216 that the pause of the drawing unit 211 is complete. The job control unit 206 then terminates this processing procedure.

Upon determining in step S1801 that the value of variable RipPause is "1", the job control unit 206 performs the processing in step S1824. The processing from step S1824 to step S1832 is the same as that from step S1802 to step S1810, and hence a description of the processing will be omitted. The processing from step S1833 to step S1841 is the same as that from step S1814 to step S1823, and hence a description of the processing will be omitted.

[Drawing Procedure]

FIGS. 17A, 17B, 17C, and 17D are flowcharts for explaining the behavior of the drawing unit 211 in the third embodiment. Note that the broken line arrows in the flowcharts of FIGS. 17A, 17B, 17C, and 17D indicate correspondence with the processing shown in another drawing.

The processing from step S1901 to step S1903 is the same as that from step S1201 to step S1203 shown in FIG. 11A, and hence a description of the processing will be omitted.

In step S1904, the drawing unit 211 refers to the value of the drawing processing control unit message reception register. If the value of the drawing processing control unit message reception register indicates "pause", the process advances to step S1906. If this value indicates "restart", the process advances to step S1912. If the value indicates "start", the process advances to step S1917.

The processing from step S1906 to step S1911 is the processing for pausing drawing processing. In step S1906, the drawing unit 211 divides the value stored in a drawn scan line count storage unit 219 by the value stored in a band information storage unit 220, and determines whether the remainder is 0. That is, the drawing unit 211 determines whether the currently processed scan line is the last line of the band. If the remainder is not 0, it indicates that the currently drawn band includes a scan line for which drawing processing has not be executed. For this reason, if the remainder is not 0 (NO in step S1906), the process advances to step S1917 to continue drawing processing for the next scan line. If the remainder is 0 (YES in step S1906), the process advances to step S1907.

In step S1907, the drawing unit 211 refers to the output destination information storage unit 217 and determines whether the output destination is a contone image data storage unit 214 or the image processing H/W 212. If the drawing unit 211 determines that the output destination is the contone image data storage unit 214, the process advances to step S1911. If the drawing unit 211 determines that the output destination is the image processing H/W 212, the process advances to step S1909.

In step S1909, the drawing unit 211 calculates a total count PixNum of pixels having predetermined color values to be output. The drawing unit 211 uses a calculation method that acquires a height H of a page and a scan line width W of the page from intermediate data. The drawing unit 211 then calculates PixNum between the start of drawing and a scan line count H1 processed up to the current time point by using equation (5):

$$PixNum = W*(H-H1) \quad (5)$$

In step S1910, the drawing unit 211 transmits pixels of predetermined color values to the image processing H/W 212. In step S1911, the drawing unit 211 stores an address as the position information of intermediate data of interest in variable RipAddr. Storing the address of intermediate data of interest in variable RipAddr allows the drawing unit 211 to start drawing processing from a midway position after restarting the drawing processing.

The processing from step S1912 to step S1916 is the processing for restarting drawing processing. In step S1912, the drawing unit 211 refers to the value stored in an output destination information storage unit 217. If the value to which the drawing unit 211 has referred indicates "contone image data storage unit", the process advances to step S1915. If the value to which the drawing unit 211 has referred in step S1912 indicates "image processing H/W", the process advances to step S1913. In step S1913, the drawing unit 211 calculates a total count PixNum of pixels which the drawing unit 211 need not generate in accordance with the intermediate data. The drawing unit 211 uses a calculation method that acquires an H1 drawn scan line count H1 from the drawn scan line count storage unit 219 and a scan line width W of a page from the intermediate data. The drawing unit 211 then calculates PixNum between H1 and W by using equation (6):

$$PixNum = W*H1 \quad (6)$$

In step S1914, the drawing unit 211 performs the processing of outputting pixels of predetermined color values to the image processing H/W 212. In step S1915, the drawing unit 211 writes "start" in the drawing processing control unit message reception register. In step S1916, the drawing unit 211 acquires the address of the intermediate data stored in variable RipAddr. This position information allows the drawing unit 211 to restart the drawing processing from a midway position of the intermediate data. The processing from step S1917 to step S1921 is the same as that from step S1606 to step S1610 shown in FIGS. 14A and 14B, and hence a description of the processing will be omitted. The processing in steps S1922 and S1923, which is the transmission processing of pixels of predetermined color values in step S1910 and step S1914, is the same as that in steps S1211 and S1212 shown in FIG. 11B, and hence a description of the processing will be omitted. Note that step S1910 implements the first transmission unit, and step S1913 implements the second transmission unit.

With the above processing, in addition to the effect of the first embodiment, the third embodiment can continue processing from an unprocessed portion of print data when restarting processing when the processing is paused. It is therefore possible to further improve the convenience to the user, reduce the load on the image forming apparatus, and improve the processing efficiency.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-234916, filed Oct. 19, 2010, which is hereby incorporated by reference herein in its entirety.

What is claimed is:

1. An image forming apparatus including a drawing unit which generates pixel data based on print data and an image processing unit which performs image processing for pixel data generated by said drawing unit, the apparatus comprising:
   a determination unit configured to determine, while said drawing unit and said image processing unit are performing processing, whether a stop instruction for the processing is received from a control unit; and
   a transmission unit configured to transmit pixel data of predetermined color values to said image processing unit for the number of pixels which have not been processed in process of generating pixel data by said drawing unit in case where said determination unit determines that the stop instruction for the processing is received,
   wherein said image processing unit performs image processing by using pixel data of the predetermined color values transmitted by said transmission unit.

2. The apparatus according to claim 1, wherein said drawing unit generates pixel data for each scan line of the print data.

3. An image forming apparatus including a drawing unit configured to generate pixel data based on print data and an image processing unit configured to perform image processing for the pixel data, the apparatus comprising:
   a first determination unit configured to determine, while said drawing unit and said image processing unit are performing processing, whether to stop the processing, when receiving a stop instruction for the processing from a control unit, in accordance with a state of process of the processing for the print data in said drawing unit at a time point when the stop instruction is received;
   a second determination unit configured to determine whether said image processing unit as an output destination of pixel data generated by said drawing unit is configured to be stopped, when said first determination unit determines to stop the processing; and
   a transmission unit configured to transmit pixel data of predetermined color values to said image processing unit for the number of pixels which have not been processed in processing of generating the pixel data by said drawing unit when said second determination unit determines that said image processing unit is not configured to be stopped,
   wherein said image processing unit performs image processing by using pixel data of the predetermined color values transmitted by said transmission unit.

4. The apparatus according to claim 3, wherein said first determination unit determines that the processing is not stopped, when a ratio of the number of scan lines processed by said drawing unit to the total number of scan lines per page in the print data is larger than a predetermined threshold, and an average drawing processing time per scan line by said drawing unit is smaller than a predetermined threshold.

5. The apparatus according to claim 4, further comprising a reception unit configured to receive a stop instruction for processing for the image forming apparatus from a user,
   wherein said reception unit receives an instruction from the user to determine whether to stop the processing or to forcibly stop the processing at a current time point in accordance with a state of process of the processing.

6. The apparatus according to claim 5, wherein said first determination unit determines to stop the processing, when said reception unit receives an instruction to forcibly stop the processing from the user at a current time point.

7. The apparatus according to claim 1,
   wherein said determination unit further determines whether said drawing unit performs reduced drawing processing in generating of pixel data; and
   wherein said transmission unit transmits the pixel data of the predetermined color values in a case where said determination unit determines that the stop instruction for the processing is received and said drawing unit does not perform the reduced drawing processing.

8. The apparatus according to claim 7,
   wherein said determination unit determines that said drawing unit does not perform the reduced drawing processing in a case where said image processing unit is set as an output destination of pixel data generated by said drawing unit, and determines that said drawing unit performs the reduced drawing processing in a case where an image data storage unit is set as an output destination of pixel data generated by said drawing unit.

9. The apparatus according to claim 1, wherein image processing performed by said image processing unit is halftoning processing.

10. An image forming apparatus including a drawing unit configured to generate pixel data based on print data and an image processing unit configured to perform image processing for the pixel data, the apparatus comprising:
    a holding unit configured to hold, while said drawing unit and said image processing unit are performing processing, pixel data processed immediately before reception of a pause instruction for the processing from a control unit and position information of pixels which have not been processed in processing of generating the pixel data by said drawing unit when receiving the pause instruction;
    a determination unit configured to determine whether said image processing unit as an output destination of pixel data generated by said drawing unit is configured to be stopped, when receiving the pause instruction;
    a first transmission unit configured to transmit pixel data of predetermined color values to said image processing unit by the number of pixels which have not been processed in processing of generating the pixel data by said drawing unit, when said determination unit determines that said image processing unit is not configured to be stopped; and
    a second transmission unit configured to transmit the predetermined color values to said image processing unit by the number of pixels included in print data held by said holding unit and have undergone drawing processing, after the image forming apparatus returns from a pause,
    wherein said drawing unit continues drawing processing based on the position information held by said holding unit after the image forming apparatus returns from the pause.

11. The apparatus according to claim 10, wherein the print data is divided into bands each including a plurality of scan lines,
    said drawing unit continues the drawing processing until drawing processing is completed for a band of interest for which processing is performed when a pause instruction for the processing is received from said control unit, and said holding unit holds pixel data up to a band for which said drawing unit has completed drawing processing and position information of an unprocessed band.

12. A control method for an image forming apparatus including a drawing unit configured to generate pixel data based on print data and an image processing unit configured to perform image processing for pixel data generated by the drawing unit, the method comprising:

a determination step of determining, while the drawing unit and the image processing unit are performing processing, whether a stop instruction for the processing is received from a control unit; and a transmission step of transmitting pixel data of predetermined color values to the image processing unit for the number of pixels which have not been processed in process of generating pixel data by the drawing unit in case where it is determined in the determination step that the stop instruction for the processing received, wherein the image processing unit performs image processing by using pixel data of the predetermined color values transmitted in the transmission step.

13. A non-transitory computer-readable medium storing a program for causing a computer to function as a determination unit configured to determine, while a drawing unit and an image processing unit are performing processing, whether a stop instruction for the processing is received from a control unit; and a transmission unit configured to transmit pixel data of predetermined color values to the image processing unit for the number of pixels which have not been processed in process of generating pixel data by the drawing unit in a case where the determination unit determines that the stop instruction for the processing is received, wherein the image processing unit functions to perform image processing by using pixel data of the predetermined color values transmitted by the transmission unit.

* * * * *